United States Patent
Jakobsson et al.

(10) Patent No.: US 10,887,447 B2
(45) Date of Patent: Jan. 5, 2021

(54) CONFIGURATION AND MANAGEMENT OF SMART NODES WITH LIMITED USER INTERFACES

(71) Applicant: Amber Solutions, Inc., Dublin, CA (US)

(72) Inventors: Bjorn Markus Jakobsson, Portola Valley, CA (US); Stephen C. Gerber, Austin, TX (US); Peter Mankowski, Cambridge (CA); Mark D. Telefus, Orinda, CA (US)

(73) Assignee: Amber Solutions, Inc., Dublin, CA (US)

( * ) Notice: Subject to any disclaimer, the term of this patent is extended or adjusted under 35 U.S.C. 154(b) by 0 days.

(21) Appl. No.: 16/598,614

(22) Filed: Oct. 10, 2019

(65) Prior Publication Data

US 2020/0120202 A1    Apr. 16, 2020

Related U.S. Application Data

(60) Provisional application No. 62/743,854, filed on Oct. 10, 2018.

(51) Int. Cl.
*H04M 3/00* (2006.01)
*H04M 1/725* (2006.01)
(Continued)

(52) U.S. Cl.
CPC .... *H04M 1/72577* (2013.01); *H04L 63/0435* (2013.01); *H04L 63/102* (2013.01);
(Continued)

(58) Field of Classification Search
CPC ....... H04W 4/33; H04W 4/38; H04W 64/003; H04W 84/12; H04W 4/08; H04W 4/021
See application file for complete search history.

(56) References Cited

U.S. PATENT DOCUMENTS 6,756,998 B1   6/2004   Bilger
7,610,616 B2   10/2009  Masuouka et al.
(Continued)

OTHER PUBLICATIONS

U.S. Appl. No. 16/527,826, filed in the name of Bjorn Markus Jakobsson Jul. 31, 2019 and entitled "Managing Access Rights of Transferable Sensor Systems."
(Continued)

*Primary Examiner* — Khalid W Shaheed
(74) *Attorney, Agent, or Firm* — Ryan, Mason & Lewis, LLP

(57) ABSTRACT

An apparatus in an illustrative embodiment comprises at least one processing device comprising a processor coupled to a memory. The processing device is configured to obtain an identifier of a first node of a set of nodes deployed at a building or other structure, to associate the first node with a user account, to obtain an identifier of a second node of the set of nodes, and to associate the second node with the first node and the user account. Associating the first node with the user account may comprise, for example, establishing an association between the first node and the user account without the processing device having access to a network connection. Additionally or alternatively, the identifier of the first node may be sent to a backend server over a network connection, with configuration information for the first node being received from the backend server in response thereto.

20 Claims, 8 Drawing Sheets

(51) Int. Cl.

| | | |
|---|---|---|
| *H04L 29/06* | (2006.01) | |
| *H04W 12/00* | (2009.01) | |
| *H04W 8/18* | (2009.01) | |
| *H04W 4/33* | (2018.01) | |
| *H04W 4/021* | (2018.01) | |

(52) U.S. Cl.
CPC ...... *H04L 63/105* (2013.01); *H04M 1/72572* (2013.01); *H04W 4/021* (2013.01); *H04W 4/33* (2018.02); *H04W 8/18* (2013.01); *H04W 12/001* (2019.01); *H04L 63/0884* (2013.01)

(56) References Cited

U.S. PATENT DOCUMENTS

| | | |
|---|---|---|
| 9,990,786 B1 | 6/2018 | Ziraknejad |
| 2007/0143826 A1 | 6/2007 | Sastry et al. |
| 2009/0203355 A1 | 8/2009 | Clark |
| 2013/0300534 A1 | 11/2013 | Myllymaki |
| 2014/0096272 A1 | 4/2014 | Makofsky et al. |
| 2014/0266698 A1 | 9/2014 | Hall et al. |
| 2015/0282223 A1 | 10/2015 | Wang et al. |
| 2015/0355649 A1 | 12/2015 | Ovadia |
| 2016/0035159 A1 | 2/2016 | Ganapathy Achari et al. |
| 2016/0374134 A1 | 12/2016 | Kweon et al. |
| 2017/0026194 A1 | 1/2017 | Vijayrao et al. |
| 2017/0033942 A1 | 2/2017 | Koeninger |
| 2017/0099647 A1 | 4/2017 | Shah et al. |
| 2017/0171802 A1 | 6/2017 | Hou et al. |
| 2017/0195130 A1 | 7/2017 | Landow et al. |
| 2017/0230193 A1 | 8/2017 | Apte et al. |
| 2018/0061158 A1 | 3/2018 | Greene |
| 2018/0146369 A1* | 5/2018 | Kennedy, Jr. ......... H04W 12/08 |
| 2018/0174076 A1 | 6/2018 | Fukami |
| 2018/0254959 A1* | 9/2018 | Mantyjarvi ......... G06F 3/04883 |
| 2018/0301006 A1 | 10/2018 | Flint et al. |
| 2018/0342329 A1 | 11/2018 | Rufo et al. |
| 2019/0028869 A1 | 1/2019 | Kaliner |
| 2019/0036928 A1 | 1/2019 | Meriac et al. |
| 2019/0050903 A1 | 2/2019 | DeWitt et al. |
| 2019/0068716 A1 | 2/2019 | Lauer |
| 2019/0104138 A1 | 4/2019 | Storms et al. |
| 2019/0253243 A1 | 8/2019 | Zimmerman et al. |
| 2019/0268176 A1 | 8/2019 | Pognant |

OTHER PUBLICATIONS

U.S. Appl. No. 16/585,438, filed in the name of Bjorn Markus Jakobsson Sep. 27, 2019 and entitled "Methods and Apparatus for Determining Preferences and Events and Generating Associated Outreach Therefrom".

Stajano et al., "The Resurrecting Duckling: Security Issues for Ad-hoc Wireless Networks," International Workshop on Security Protocols, 1999, 11 pages.

* cited by examiner

CONFIGURATION AND MANAGEMENT OF SMART NODES WITH LIMITED USER INTERFACES

RELATED APPLICATION(S)

The present application claims priority to U.S. Provisional Patent Application Ser. No. 62/743,854, filed Oct. 10, 2018 and entitled "Configuration and Management of Smart Nodes with Limited User Interfaces," which is incorporated by reference herein in its entirety.

FIELD

The field relates generally to information processing systems, and more particularly to systems that include sensors and other types of smart nodes.

BACKGROUND

Increasingly large numbers of homes and enterprises are using smart technology to sense environmental data, such as temperature, humidity, smoke, electricity consumption, loud sounds and likely human presence. Some of these smart technology nodes have traditional user interfaces, including buttons and touch screens; however, some have very limited user interfaces (UIs), if any UIs at all. Examples of such nodes include what is sometimes referred to as "smart dust," which include very small sensors that can be embedded in building materials, such as drywall, and smart ground-fault circuit interrupter (GFCI) wall outlets, which improve the functionality of electric outlets but which are designed with a minimalistic mindset, for reasons ranging from cost savings and aesthetics to form factor issues.

The type of node that the smart dust and the smart GFCI outlets are examples of is likely to dominate in terms of their sheer numbers, and will pose thorny problems in terms of access rights, security, privacy and usability unless dramatic progress is made in terms of how to configure such units in a practical manner that is accessible to typical consumers; is forgiving in terms of common corner cases (such as updates of networks, new tenants and loss of access credentials); and which protects legitimate users against abuse, including malicious attempts to infiltrate networks or to exert malicious control, such as by ransomware. Although the same problems are present for smart technologies with rich user interfaces, there are likely to be only relatively few of these, maybe three or four in a typical home, and their rich user interfaces will enable traditional access control methods.

The difficulty in achieving the same goals for the "UI limited" devices will become the weak link in home and enterprise systems unless the configuration problem for these devices is resolved in a practical and secure manner, no matter how easy the devices with rich user interfaces are to use. This is because the UI limited devices will be the weak link in the security, privacy and practicality of systems comprising at least some of these UI limited devices. Conventional approaches have thus far failed to adequately address such issues. It is therefore critical to address this weak link in order to enable security and privacy for such networks, and therefore, critical to address in order to reap the outstanding benefits promised by smart technologies, whether we consider the energy saving opportunities or the improved functionality that such systems can provide.

SUMMARY

Illustrative embodiments provide techniques for configuration and/or management of smart nodes with limited user interfaces. For example, these embodiments include technologies that resolve the problems of configuring smart technology devices, especially those with limited user interfaces, and that also address the continued maintenance and access to such systems, both for the typical cases and for less common cases that otherwise could cause the loss of functionality to such systems.

In one embodiment, an apparatus comprises at least one processing device comprising a processor coupled to a memory. The processing device is configured to obtain an identifier of a first node of a set of nodes deployed at a building or other structure, to associate the first node with a user account, to obtain an identifier of a second node of the set of nodes, and to associate the second node with the first node and the user account. Associating the first node with the user account comprises, for example, establishing an association between the first node and the user account without the processing device having access to a network connection. Additionally or alternatively, associating the first node with the user account may comprise sending the identifier of the first node to a backend server over a network connection. Configuration information for the first node may be received from the backend server responsive to sending the identifier of the first node to the backend server. Associating the second node with the first node and the user account may occur automatically responsive to initiation of a designated association process at the processing device without requiring communication between the processing device and the backend server.

These and other illustrative embodiments include but are not limited to systems, methods, apparatus, and computer program products. The illustrative embodiments are advantageously configured to address and solve one or more significant problems of conventional approaches, as outlined in more detail elsewhere herein.

DETAILED DESCRIPTION

Figure 1:
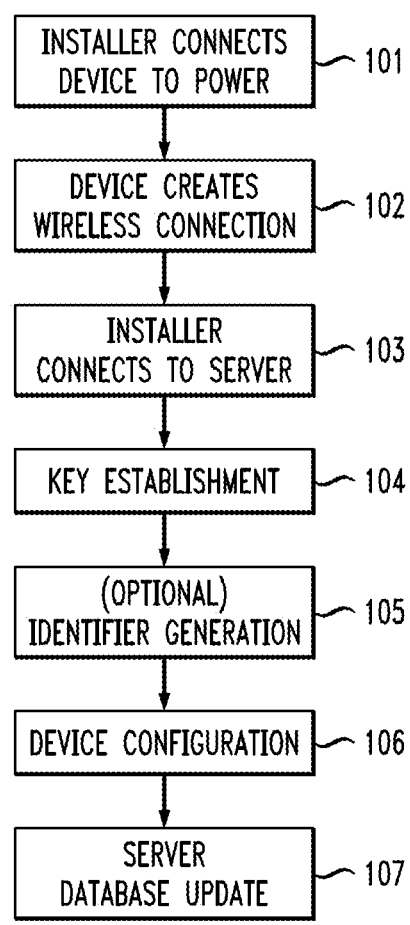
FIG. 1 is a flow diagram of a process for configuration and management of smart nodes with limited user interfaces in an illustrative embodiment.

Illustrative embodiments will be described herein with reference to exemplary information processing systems and associated computers, servers, storage devices and other processing devices. It is to be appreciated that the embodiments described below are presented by way of example only, and should not be construed as limiting in any way.

In regular access control scenarios, a user with a certain access right level can bestow upon another user the same or a lower level of access rights. This is not suitable for the scenario we address in illustrative embodiments herein; for example, an installer may only have the right to install units and to configure them, and to hand over full control to a resident, but not to have full access on his or her own. That partitioning serves a dual purpose of both limited access to that residence by an installer and ease of deployment. Similarly, a landlord should be able to give a tenant full control over some aspects, such as viewing camera footage in the apartment, but the landlord should not have these rights. In a home or commercial setting, these types of requirements are a necessity. However, traditional access control systems are not suited for this, as the person who delegates or assigns access control (e.g., an installer or a landlord) may be malicious, and want to create an account that has full access, and delegate control to that and to the resident or tenant. Limiting the number of resident or tenant accounts is clearly not the solution to this problem, as a unit may have a large number of such users. Illustrative embodiments advantageously address these and other unsolved and important problems relating to configuration and management of smart nodes.

Seamless incorporation of new devices into a network is a very important goal of some embodiments, and it is poorly addressed by existing solutions, which typically need customized setup and connection, and do not interconnect with other devices and structures without substantial effort. It is desirable to provide solutions that are not seamless, but also offer the highest security guarantees against various forms of abuse, including malicious actions by the installer or a party able to intercept wireless traffic at the time of the installation, as well as parties who maliciously install a node that will misbehave, e.g., exfiltrate data to the malicious party. It is also valuable to offer plug-and-play integration with devices that are not manufactured by the service provider. It is further beneficial to provide a uniform interface for maintenance, access and access control to a collection of devices using a common portal or access tool. Existing solutions are deficient on these grounds. Some embodiments provide methods to address this important problem. Without these techniques, the effort of installation is dramatically increased, as is the risk of improper configuration, maintenance and access; that would result in gaping security holes associated with Internet-of-Things (IoT) installations and other types of installations involving sensor networks or other arrangements of smart nodes.

Illustrative embodiments disclosed herein address these and other related needs associated with configuration and/or management of smart nodes. Such smart nodes can comprise, for example, sensor devices, IoT devices, or other similar devices having what are referred to herein as "limited user interfaces." For example, a smart node with a limited user interface may include only a relatively small liquid crystal display (LCD) screen or no display screen at all, and/or may comprise only a few user-actuated buttons or other input mechanisms for controlling certain basic functions of the smart node. A limited user interface in some cases may refer to an arrangement in which there is no user interface.

As will become apparent, the disclosed technology addresses a large range of problems and scenarios, examples of which are described herein in the context of exemplary embodiments. In the following description, we refer to a "node" in some cases as a smart device, where for purposes of clarifying the capabilities, this node is assumed to have a limited user interface; however, as a person skilled in the art will recognize, the problems and scenarios described herein are also relevant in the context of smart devices with rich user interfaces. The term "node" is therefore intended to be broadly construed. In some embodiments, nodes comprise respective processing devices each comprising a processor coupled to a memory, or other types of circuitry, although numerous other node configurations utilizing other arrangements of hardware, software and/or firmware are possible.

In the following, we consider the following example scenarios for purposes of describing illustrative embodiments:

1. New construction in which a newly built home or office is being outfitted with nodes. This scenario commonly involves physical access to the nodes by a large group of individuals that are only temporarily trusted with access, and who will preferably be able to hand over their access capabilities to an administrator ("admin")/owner or tenant/user after having performed an initial system configuration; or leave the presence of a system that can have "ownership" assumed only through a future physical presence (with or without a keycode (e.g., multi-factor authentication (MFA)).

2. Remodeling in which an already built home or office is retrofitted by installing nodes. This scenario commonly involves providing backwards compatibility with pre-existing networks and infrastructure, some of which may be nodes provided by manufacturers other than those that provided the installed nodes.

3. Replacement of damaged or broken nodes with new nodes, typically of the same brand, but potentially a different model. There is typically a pre-existing network environment to which the new nodes have to be introduced and start operating in, and wherein the pre-existing network needs to recognize the new nodes as belonging to the network.

4. Addition or expansion of nodes in a pre-existing node network, wherein the new nodes extend the reach or functionality of the pre-existing network, and wherein the pre-existing network needs to integrate the new nodes into its system.

5. Assisted handover of control, in which an existing owner/admin bestows the access control capabilities to a new owner/admin, who typically but not necessarily is not present at the same time as the existing owner/admin.

6. Forced handover of control, in which a new owner/admin acquires access control over the node network without the active collaboration of the existing owner/admin. This may happen when an existing owner moves in a rush; passes away; or is not willing to hand over control.

7. Assisted delegation of control, in which an owner/admin or a tenant/user grants access rights to an additional tenant/user; wherein these access rights may be limited in terms of the time they are made available, or unlimited; and wherein they may be limited in terms of the capabilities granted (such as read access only; only access to some subsystems or functionality; no delegation rights; or only access to curated data, such as daily logs).

8. Recovery of access to a system by a user who has been granted access, but whose device(s), such as computers or phones, have been replaced or reset, thereby causing a failure to access the system.

9. Unlocking of functionality associated with the node network, by an owner/admin or tenant/user, wherein the unlocked features correspond to services or functionality for which a subscription, a payment, a special access key, or other unlocking event, is required. Here, it is desirable to allow the unlocking to be performed by a variety of parties, including parties with owner/admin roles or tenant/user roles. It is beneficial for the system, in some contexts, to implement profit-sharing wherein a party having made a financial investment related to the installation of one or more nodes receives a benefit from the unlocking of the feature.

However, there are also many abuses or problems that should be considered in the context of the system. These are events that may be attempted to be performed, but which it is beneficial to identify and block, or which it is desirable for the design of the system to not enable or make difficult or otherwise undesirable for the party attempting to perform the actions; or where it is desirable that a legitimate user (whether owner/admin or tenant/user) gets notified of if they are attempted:

1. Access to the node network by a party who is not authorized to access it, including a party who has previously had owner/admin rights but handed these over; a party who has previously had tenant/user rights but where these have been revoked, expired, or not maintained in a manner that is required for continued access.

2. Access to the node network by a party with temporary physical access to the network, such as a home cleaner or contractor, wherein this party attempts to acquire control over the network by performing tasks or actions associated with forced handover of control, recovery of access, or similar legitimate processes intended to enable forced access.

3. Undesirable delegation of access by a party who is not owner/admin, but who has been granted temporary or permanent access to the node network.

4. Suppression of alerts, where the alerts are intended to notify an owner/admin or tenant/user of system events, where some of these events may be indicative of abuse or attempts to abuse.

5. Forced alerts generation to extract data points back to the un-authorized party.

6. Traffic eavesdropping by a party wishing to infer at least a portion of the state of a system for which he or she is not granted access to such state information.

7. Malicious incorporation or physical tampering of nodes for the purpose of subverting the security or privacy guarantees of the system, where the incorporated nodes may attempt to access network state information in order to convey this to a party that does not have access rights to such information.

Like the desirable settings, the list of abuses and problems is also exemplary, and a person skilled in the art will recognize that there are many related abuses and problems that are also addressed by the disclosed technology. The disclosed technology solves these problems, and other related problems, and provides a highly usable and secure system that can be installed, configured and maintained in an affordable manner, and without specialized knowledge or equipment. Therefore, the system provides significant improvements relative to the prior art and deployed IoT systems, including both commercial and residential products and technologies, and in a manner that is highly automated and does not involve costly procedures to set up, operate, delegate or hand over to another entity.

Illustrative embodiments include methods to configure and maintain one or more nodes, using one or more display devices. Example display devices comprise smart watches, cellular phones, tablets, laptops, desktops, and household appliances with display capabilities and user input capabilities, including other smart devices, such as smart thermostats. Certain types of display devices are also referred to herein as mobile devices or user devices, and illustratively represent examples of what are more generally referred to herein as "processing devices." The display device may be in the possession of the owner/admin, tenant/user, a security company, a service company such as an electric company, an Internet service provider (ISP), a shopping portal, a homeowner's association, a physical maintenance company, and so on. It is beneficial for the technology to permit multiple display devices to be used, whether by the same or different entities, and whether with the same capabilities or with different capabilities. As noted above, such display devices can include mobile devices, user devices, or other types of processing devices. In some embodiments, a display device can additionally or alternatively comprise a smart node or other type of node of a node network.

It is further beneficial to enable delegation of capability and authority. The delegation may be time limited, such as for a house guest being given access until he/she leaves; for a cleaning company to be given access on a periodic basis; for a shopping portal to be granted access for the purposes of performing a review of needs and generate product recommendations, which can be a time-limited capability or performed on an ongoing basis. The delegation may also be unlimited in time, but preferably possible to revoke, to match the access needs of a long-term tenant; an electric company or carrier who is given access until revoked, as the owner/admin or the tenant/user is selecting another service provider; or associated with an owner/admin until the associated property is sold.

Each display device is associated with at least one party, where each party is associated with a role or set of capabilities. The set of capabilities determine the data that can be accessed; the granularity of the data; whether data can be accessed essentially in real-time or only with a privacy-preserving delay, such as with a one-month lag; whether the party can modify configurations, and if so, what types of modifications are permitted; and whether the party is allowed to delegate or transfer access. The set of capabilities also define the manners in which users are allowed to control the system. For practical purposes, each party may be associated with an email address, a phone number or another identifier that is also used for purposes of communication, where such communication may be used to send notifications, alerts, reports, system analysis data, etc.

In one embodiment, the parties with access rights use a credential, such as a password, a biometric credential, an access token such as SecurID or Google authenticator, or cookies or machine identifiers associated with a display device, in order to gain access to a portal associated with data access and/or configuration capabilities.

In one embodiment, there is no use of traditional authentication methods, and instead, anybody with physical access to a node associated with the network, such as a smart home terminal, is granted access to the portal. An example smart home terminal is embodied by an appliance with at least some I/O capabilities. The portal is preferably a software-enabled access module that has access to a data repository, where the data repository stores system events and/or system configuration parameters. In one embodiment, this data repository is part of the on-premises system, and is part of a user device used as a display device; in another embodiment, the data repository is cloud-hosted and is in periodic or constant contact with at least one node of the network, using a communication network that may use a local WiFi, Bluetooth or other wireless network or which may communicate signals from at least one node to an access device by modulating a signal on the home electric system, thereby transmitting signals over the wires that are used for electricity delivery.

The communication network may also require a user to download data from a node to a display device or other communication device by using a communication method based on wireless communication. In one embodiment, data is conveyed to and from at least one node in the system using an Ethernet connection, phone cable, a network provided by an ISP, including digital subscriber line (DSL), fiber, or satellite signal, or cellular telephony networks. A centralized storage of at least some system data is beneficial for purposes of avoiding network data losses; allowing remote access by an authorized user with an Internet connection; centralized analysis of data, including comparisons between different systems for purposes of improving functionality and efficiency.

In some embodiments, each space, such as a home, an office, an office building, etc., is associated with one account, where an account is a logical entity with associated access privileges and method of access. The access relates to one or more nodes, connected in a network or being otherwise accessible from a portal associated with the account. Such an account is an example of what is more generally referred to herein as a "user account."

A user accesses information using credentials or one or more display devices with a physical association to the one or more nodes. The one or more nodes are also preferably connected, using a communication network, to the repository with associated processing capabilities. The system stores event data in the repository, wherein event data comprises measurement data from sensors associated with the network of one or more nodes, and wherein event data also comprises control data provided by a user or a script for the control of functionality associated with the network of the one or more nodes. Furthermore, the repository also preferably stores configuration data in the form of user settings, policies, parameters obtained from machine learning components, and the like.

The system causes the collection of event data from nodes and the transmission of this data to the repository and the delivery of control data from the repository to the nodes. The system also permits the access, using one or more display devices, using one or more software portals, to data stored in the repository. This data is only accessible to parties with the proper credentials and/or registered display devices. The system preferably automatically collects sensor data from the nodes and delivers it to the repository, associating the sensor data with the appropriate account; it furthermore schedules delivery of control data to nodes, based on collected sensor data, configuration data and contextual information such as the time of the day. When a party wishes to access data from the repository, whether sensor data, data relating to policies or configuration, or other data, the system determines that the party possesses the access credentials or physical device identifier, and then conditionally permits access.

When a party is given access, the portal associated with the display device used by the party to access the data of the repository, and enable changes to this data, is used to visually present information to the party. Parties who are not permitted access are not allowed to obtain data or make changes to data. Preferably, the communication performed by the system, between nodes and the repository with its associated processors and between display devices and the repository with its associated processors, uses a secure channel, meaning that all transmissions are authenticated and encrypted, e.g., using Secure Sockets Layer (SSL)/Transport Layer Security (TLS) or point-to-point encryption methods supporting some form of checksumming or authentication. A person skilled in the art will recognize that a wide variety of suitable methods can be used for providing secure channels, using symmetric cryptography, asymmetric cryptography, or hybrid models relying on both symmetric and asymmetric cryptography.

We have described two illustrative types of end-user roles in the above, namely owner/admin and tenant/user. This is only for purposes of providing an illustrative example of different roles, and a person skilled in the art will appreciate that the system supports many additional or alternative roles. For example, one can have a system in which the owner/admin represents an owner of a piece of real estate that is used as a cafe; where the tenant/user corresponds to a party that rents the piece of real estate and runs the cafe; and wherein a third type of party, the visitor, is a party that comes to the cafe for a drink and to use its infrastructure. Here, the infrastructure may correspond to charging facilities, wireless or wired Internet facilities, the use of external screens and keyboards connected by a visitor to his or her device, and so on.

In this example, these three types of parties have different access rights and capabilities, which are stored by the system as access right descriptors. The owner/admin, for example, bills the tenant/user a fixed amount every month for the use of the space and its associated infrastructure, and if the tenant/user does not pay, then the owner/admin denies access to the space and the infrastructure. The tenant/user bills the visitor per hour for his or her use of the infrastructure. The visitor may be the only party with the right to access data that goes over the network, whether in an encrypted or unencrypted form, but needs to pay for the use or he or she is blocked. This, of course, is only one illustrative example of a system with three different types of parties with different access rights, and a person skilled in the art will appreciate that the disclosure anticipates the use of the disclosed system by any number of parties, and that these can have access rights and capabilities assigned to them on an individual basis as well as on a role-basis. It is only for purposes of denotational simplicity that the disclosure has focused on role-based access until now, as will be appreciated by a person skilled in the art.

As another example, a system can be configured to include one configuration that is "realtor." When accessed by a user with that classification, the system monitors and logs all activity, records the duration of the visit, the number of apparent users in the space, the actions taken in the space, etc. Some of this information is made accessible to a user (such as the landlord or the owner) whereas other information (like the microphone data) is only saved in an aggregate form, indicating when users were present and speaking, but not what they said. Special permissions such as unlocking the door can be associated with the realtor type of user, but only during time periods that have been indicated as acceptable by the admin. As the users leave, the system preferably notifies the landlord/owner of the visit and locks all doors, if not already done. An admin can configure the policies associated with the realtor type of user.

In the following, we will describe how the system works in illustrative embodiments by giving examples of methods used to achieve the goals associated with the scenarios listed above, while resisting abuse of the types also described above. A person skilled in the art will recognize that these are simply exemplary embodiments, and the system is not limited to this functionality.

In one embodiment, each physical element, which may correspond to one or more nodes, is associated with a key. For example, a physical element and the corresponding node may be an enhanced GFCI outlet; alternatively, the physical element may be a sheet of drywall, with tens or hundreds of nodes embedded, at least one of which is configured to communicate a signal to/from an external entity, such as another node, a wireless network element, or a phone; and wherein the one or more nodes are connected to each other using wired or wireless technology including optical technology, audio technology and traditional radio-based technology, or are able to communicate with the external entity using a wired or wireless signal. Each one of these physical elements is an atomic unit in terms of the associated node.

The physical element is associated, at the time of purchase, during installation, or during a configuration phase, with an identity that is preferably unique to the physical element. The identity is expressed as a character string. In one embodiment, this character string is sufficiently long and sufficiently unpredictable to be essentially impossible to guess using a brute force attack. In this example, a party installing the physical entity obtains the key from the physical element and performs a registration of it. In another embodiment, the string is sufficiently long to be essentially unique, and registration requires physical presence of an external device. The identity of the physical element is preferably printed on the physical element, or on a sticker that is placed on the physical element, where the identity is preferably not visible to the party until the physical device is taken out of its packaging and gotten ready to be installed. The identity can be covered by a scratch-off screen. If the party installing the physical element finds the scratch-off cover already scratched, he or she would suspect that the identity may already have been registered. As will be described onwards, this does not prevent secure registration.

To register the identity of a physical element, the party wishing to perform the registration first initiates the creation of an account. An account, preferably, is associated with at least one user name, which could be an email address, a phone number, or any unique string that preferably is memorable to the party registering it, or which will be written down by this person. The account is preferably also associated with at least one access credential, which may be a password, a PIN, a biometric template, or a device identifier associated with a device that is understood to be protected in that it is not publicly accessible. It is beneficial to associate the account with a communication address, such as an email address or a phone number, since that also can be used for reset or transferal purposes.

After an account has been created, one or more identifiers associated with physical elements are associated with it, by being added to the account. This could be expressed as a character string or a scannable 2D barcode, or another visual expression. The system managing the registration has a database containing all accounts with their associated registered identities of physical elements, and also, a list of all identifiers that have been produced. Alternatively, the latter can be replaced by a function that allows the derivation of all such identifiers, or the verification of identifiers. In one embodiment, the identifiers of the physical elements comprise digital signatures on counters or other unique strings, or other authentication codes and their associated counters or unique strings; such values can be verified by the system.

The identifier can be read by the person, and copied into a website where the registration is performed, or scanned by a barcode reader associated with an application ("app") on the person's phone, where the barcode can also encode the URL of the site where the registration is performed. When the system receives as input the identifier of a physical element, it verifies that it is a valid identifier. If this identifier has not yet been registered by associating it with an account, then that association is made to the selected account, which the user performing the registration should preferably be able to access by use of the associated credential, described above. If the identifier of the physical element has already been registered, the system looks up the account with which it is associated, which we refer to as the second account, preferably notifies at least one party associated with the second account of the transfer; removes the identifier from the second account, and adds it to the account that it is being associated with.

In some embodiments, the registration of an identifier and the associated physical element requires physical presence to the physical element with a device or node in control of the party performing the registration. For example, a user registering a Bluetooth-enabled node associated with a GFCI outlet would have to have a Bluetooth connection with the GFCI outlet and access to the identifier, in order to register the physical element, which is the GFCI outlet, to an account. This is preferably demonstrated by the user receiving a challenge from the system, transmitting this to the physical element using the Bluetooth connection; receiving back a response that is a function of the challenge and a key that is stored in a repository such as an electrically erasable programmable read-only memory (EEPROM) associated with the GFCI outlet, and where this key preferably is not the same as the printed identifier associated with the outlet; and where the system is able to verify that the response is correct based on storing, in a repository, the identifier and the key, and being able to compute the response value and compare that to the obtained response.

In another embodiment, the physical element stores both the identifier and the key in a repository, and the user registering is not required to read or scan the identifier, but only to press a button associated with the node, causing the node to generate a transmission containing the identifier, which is transmitted to the system for registration purposes; after which the node receives, via the device of the user registering it or another nearby node on the network, a challenge, and sends a response, which is verified as described above.

All of these cases involve conveying an identifier, which is associated with the physical element, wherein the process proves privileged access to the physical element, e.g., by being able to read or scan the identifier and/or by being co-present with the physical identifier. A person skilled in the art will appreciate that there are variants of these example methods of providing evidence of privileged access to the physical device to be registered. In the above, we assume for simplicity that all registered identifiers are associated with the accounts used in the context of owner/admin, although a person skilled in the art will recognize that other arrangements are possible, such as ones in which a user with another role registers the identifier that indicates the identity/identities of the user(s) whose role will be owner/admin. Assignments, re-assignments and delegations are described in greater detail below.

In one embodiment, an owner/admin wishes to provide access rights to another party, such as a tenant/user, whether for one or a collection of nodes, but not to another node or collection of nodes also controlled by the owner/admin. For practical purposes, it is therefore beneficial to enable grouping of nodes and/or physical elements into clusters, where these clusters may be given names and access rights are granted, transferred or revoked in such groups. One node may belong to multiple groups; for example, such a node may be a shared resource, such as the entrance light to an entrance shared between two apartments. Tenants/users, which is a term we refer to as a party that does not have transfer rights to a resource, may have rights to access some or all of these. Any party with access rights to a group of nodes may create subgroups, and if the party has the right to delegate or transfer access to these nodes, it can do so based on the associated group.

It is beneficial for parties to select what nodes belong to a group and to associate such groups with a name such as "lower level" or "guest room." A party may have owner/admin rights to some nodes, and tenant/user rights to others; in an embodiment with yet other levels of access, such as "read-on access" or "delayed, aggregate read-only access," a party may also have access to some nodes with such capabilities. Some access types indicate transferability or limited transferability; others delegation rights or limited delegation rights. For example, a party with full read/write access, but without transferability rights, may still have rights to temporarily allow another party limited access, whether to read or write data. Here, reading data corresponds to accessing output of sensors, or aggregated sensor data, whereas writing data means to control the functionality of the node, such as turning up the volume, reducing the current, switching off a circuit, etc.

In one embodiment, the device that a party uses to register nodes is a smartphone, which preferably comprises an app for accessing the system, registering nodes, accessing nodes, controlling nodes, and performing modifications to the access rights. This app preferably has a 2D barcode reader, a textual entry interface, or other type of interface. Alternatively, a party may perform the same tasks using a web browser on such a device, accessing a web page associated with the service. In one embodiment, a party creates an account using a laptop, and then uses a phone or a tablet to register nodes, causing each registered node to be associated with the created account; and then, uses the laptop or yet another device to manage configurations, perform delegation tasks, perform transfers, and perform other related functions. The same functionality can also be accessed using a dedicated device that the user employs for controlling his or her system. The system further supports parties with accounts to generate requests to other parties for access rights.

In a context in which a party has his or her home remodeled, he or she may add additional nodes to a pre-existing network. This is preferably done by registering them under the same account as the other nodes of the pre-existing network are associated. Alternatively, the new nodes can be registered to an account associated with a contractor, and then reassigned or transferred to the owner/admin. In some cases, the party residing in the home may have ownership access rights to some nodes and tenant access rights to others. The same goes for access to physical elements, which is a term that is used largely synonymous with nodes in this disclosure, except where a specific distinction between the two is intended. A physical element corresponds to one or more nodes; however, multiple nodes can also be viewed as a composite node, making the two terms the same for many purposes.

There is an additional benefit of associating nodes into groups, beyond simplifying the granting of access in one way or another; namely, in a network where multiple nodes are associated in the same network, by means of belonging to the same group, the nodes can operate in unison, or depend on each other. For example, when one node detects the presence of a person, then another node can be controlled to switch on the light. The operation of and interaction between nodes can be managed by means of macros, which correspond to sets of instructions corresponding to the operation and cooperation of one or more nodes.

Such macros are preferably provided by the system for common tasks, such as "turn off all lights when nobody is at home" and "when nobody is at home and it is dark outside, turn on and off lights to mimic movement in the house, but end at regular bedtime" and "observe the temperature preferences of the user and set the right temperature in anticipation of the user's observed preferences." This is provided by the disclosed system. It is also beneficial with scripts that can be customized, e.g., a script that refers to some lights that are turned off at night, allowing a user with access to the corresponding nodes to select what nodes (and corresponding lights) this rule or macro applies to, preferably using a drag-and-drop interface.

A party with access to one or more nodes, arranged in terms of one or more groups, may wish to replace one or more nodes associated with one or more groups. The disclosed system supports this action by allowing this party to add a new node, or physical element, to the account, associating it with one or more groups; and optionally assigning access rights to one or more other parties, where these access rights corresponds to pre-set roles, such as "owner/admin" or "tenant/user," or corresponds to select access capabilities associated with the role of the party to be given access. The party with access to the one or more nodes can also remove a node or a group, or change the access to a node or group of nodes. Similarly, the party can replace one node with another node.

The system recognizes the replacement of nodes in a group. Preferably, the system will automatically generate a group for each node in its system, and obtain a label for this, such as "entrance electric outlet" or "kitchen corner GFCI." A user, physically replacing one node with another can then remove the old identifier associated with the group associated with the node while retaining the group and its label, and then add the new node identifier for that group; or the other way around. This is an indication of a replacement of one node by another. A macro preferably relates to a set of one-node groups, meaning that as a node is physically replaced, the macro remains the same. If the new node has different capabilities than the node it replaces, the functionality is preferably automatically updated, when applicable. This is achievable with macros that require nodes with certain set of sensors, but which when additional sensors are available, receives and use this additional information, where applicable. Such additional information typically offers greater precision for the computation.

An example of two related macros is:
When
(time is: after 10 pm and before 4 am) and
(movement-sensor(no-movement, 10 minutes)) then
   All-lights(off)
   Nightlights(on)
When
(time-is: dawn) then
Nightlights(off)
This can be created by a voice-driven interface. An example conversation is:
Device: Say "new program" to create a new program
User: new program
Device: You have selected to create a new program. At any time say "no" to go back one step. Select from the following types of programs by saying any one of the names, or saying yes: When it is night, when I wake up, when I am not at home, when I come home, when . . . .
User: When it is night Device: You have selected to create a new program for when it is night. When do you normally go to bed? Please say a time, such as "nine o'clock, ten-thirty, midnight."

User: Ten o'clock.

Device: You said ten thirty. Do you want to . . . .

User: No

Device: I am sorry. When do you normally go to bed?

User: Ten o'clock.

Device: You said ten o'clock. Do you want to turn off all the lights at ten o'clock, unless you are still up then?

User: Yes.

Device: You want to turn off all the lights at ten o'clock, unless you are still up then. How long should things stay on if you do not move around? Please say a number of minutes.

User: Ten.

Device: You said ten minutes. Do you want the lights to stay on if your TV is still on?

User: No.

Device: You said you do not want the lights to stay on if the TV is on. Do you want all lights to go off at ten o'clock, or do you want some lights to remain on or be turned on?

User: All off.

Device: You said you want all lights off. Would you not want the night lights to be turned on?

User: Yes.

Device: You said you want the night lights to be turned on. Do you want them to be on all the time, or only if movement is detected?

User: all the time.

Device: You said all the time. Do you want the night lights to be turned off at dawn?

User: Yes.

Device: You said that you want the nightlights off at dawn. You have now completed the program. Say "new program" to create a new program.

The system also preferably makes other interfaces available for creating macros, such as command-driven and image-driven programming languages, also referred to as command box programming, and using templates of macros that the user can choose from and modify.

Another embodiment is what we will refer herein to as intelligent control. In one example corresponding to this embodiment, the system determines that there are two common users associated with a space. These two different users are distinguished by the system by the sound of them walking (microphone input); their size and optionally features (camera input); their preferred locations (various sensors); their common actions (various sensors); and their preferences, as judged by the controls they indicate. Example of controls indicated by the users are temperature settings, lighting preferences, consumption habits such as making coffee and the like. Not all users have the same preferences, and potentially, the two (or more) users associated with one space may have very distinct preferences. The preferences of the users may include whether they are alone or not, and if they are not alone, with what other user(s). Additionally, there are preferences that depend on time of day, day of week, content of the schedule of the person in question, and other similar information.

The system identifies the users and their likely preferences and preemptively performs customized settings that maximizes the probability of being the preferred choices of the users present. One example corresponds to temperature settings. A room mostly used by a person who likes it to be warm is set to be warmer than a room mostly used by a person who likes it to be cold. Here, the preferences are inferred from a variety of inputs, including what settings the user makes (e.g., increase/decrease the temperature); whether the person appears to toss and turn at night as a result of it being warmer than the person prefers, the consumption of hot vs. cold water when the person is taking a shower, the sound of the person walking, indicating whether the person is wearing thick socks, is barefoot, or wearing shoes.

Another example is lighting, wherein the system determines the likely identity of a user and selects, based on the detected location of the user and the determined activity of the user, what lights to turn on and how high. There is an instant feedback loop here: if a user does not like the light settings that are selected, he or she will commonly correct that by either turning on or off lights, or changing their intensity. This way, the system fine-tunes its selection of light. Other anticipatory configurations and settings are also possible. For example, a user who has indicated that he/she likes for the system to select music for him or her over the course of the day will determine, based on the determined user identity, the presence of others, the time of the day, the apparent activities, and other types of information, what music and what volume the user is likely to enjoy, and play corresponding music on a loudspeaker close to the user. Here, too, there is an immediate feedback loop, with the system identifying that a user overrides the selection under certain circumstances, allowing the selection algorithms to be modified accordingly. This is preferably done using a machine learning system taking all the observed parameters into consideration.

The system also adapts to activities as they take place. For example, if the user(s) place or receive a phone call, this may cause the system to change the configurations. The same techniques are also useful in the context of programming, such as TV, selected radio shows, etc.; here, additional contextual information affecting the system selections include information about what is being broadcast, and whether the user has expressed an interest for this before. The user can preferably select preferences affecting the selections, e.g., "I like being woken up with music, but not if I have to get up before 7 am," "always ask before you turn on the TV," "only automate selections when I am alone," etc. These user-provided configurations help the system determine suitable configurations quickly.

In one embodiment, a user selects sets of privileges to be granted to various types of users. This can be done using a menu of common choices, or by programming of individual policies, as described above. Example common choices are:

1. Enable anybody in the space with a compatible control device, such as a phone with Amber's control app, to turn on and off the lights.

2. Enable anybody within wireless reach of the router to pay for access to the router, provided the system is not at or above 80% of its bandwidth capacity.

3. Enable anybody registered as "guest" in the system to control the TV, music player, and lighting using a compatible control device.

4. Enable anybody registered as "occupant" in the system to remotely control the system, including temperature, locking doors, and accessing the camera of the living room.

5. Enable the following users (select from a menu) to remotely unlock doors.

Thus, it is important for the system to classify users in terms of types, relative to a particular space. This is preferably indicated when a user requests access to the system for a given space, which can be performed using techniques described in U.S. patent application Ser. No. 16/527,826, filed Jul. 31, 2019 and entitled "Managing Access Rights of Transferable Sensor Systems," which is incorporated by reference herein in its entirety. For example, the requesting user would preferably select a type of user he wishes to access the system as, e.g., "I am: (1) a guest, (2) an occupant, (3) an admin, (4) other." Anybody with occupant or admin access can configure additional categories and name these, and associate them with access rights, whether by choosing from a list of functionalities, or by choosing from a list of two or more common types of roles (e.g., maintenance person, home cleaner, babysitter, short-term guest, long-term guest) where these roles correspond to access rights commonly conveyed to a person in that corresponding role, but which can also be configured by the admin or occupant, e.g., "All babysitters have access to the following functionality: (list of functionalities here, from which the user can add/remove)." Here, "occupant" corresponds both to a tenant and to an owner that is not a landlord. The occupant can also indicate what types of users can grant access to other users, and what kind of functionality can be granted by such users.

Consider a first node to be introduced in what will later become a network. As it is installed, the installer connects it to the backend by registering it to a profile. If no profile has yet been generated, then the installer creates this. A profile preferably comprises data such as:

1. Type of installation; e.g., commercial or residential.
2. For a residential installation, the type of expected users; e.g., landlord and tenant, owner.
3. Location of installation, e.g., address.
4. Information about the type of Internet connection, if known.
5. Privacy settings, e.g., whether the resident(s) agree to having their full data reported to the backend in order to improve the system training.
6. Contact information of the resident or a representative of the resident, along with information about the role of the person whose contact information is provided.
7. Password(s) for access to the network by the installer and/or other users.

As the first node is added to the profile, it is added to the profile. Each node corresponds to a serial number or other identifier, and by entering that by hand, by scanning a barcode or quick response (QR) code or similar, or by obtaining the information by near-field communication (NFC) using a device used for registration or similar, the node information is added to the profile. The node information comprises the type of node, e.g., switch/outlet/breaker/router/third-party device/other. The installer is asked for a description of its location, which can be selected from a dropdown menu of common choices or entered in free-form text; an example descriptor is "master bedroom." In one embodiment, the system is used to determine its approximate Global Positioning System (GPS) location from the installer device during provisioning. This can be done by requesting, from the installer app, the GPS location. Alternatively, the IP address(es) of the installer device and/or the installed node can be used to infer the approximate location, or a combination of different indications.

The system enables the addition of additional nodes in a pre-existing node network, wherein the new nodes extend the reach or functionality of the pre-existing network, and wherein the pre-existing network needs to integrate the new nodes into its system. When a user or a proxy of the user introduces a new node into the network, e.g., by plugging in a device that comprises a node, then the system determines this and performs the suitable configuration. For example, assume a user adds a new connected switch to replace a traditional non-connected switch, thereby introducing a new node in a network which we assume comprises at least one node. The node is preferably added by logging in to the profile and entering the node identifier, such as a serial number. The system attempts to automatically determine the location relative to already installed nodes, e.g., by causing the new node to play an audio or ultrasonic ping and having the other nodes listen for this and report its strength. Similar location determination can be performed using wireless radio, e.g., by triangulation or measurement of signal strength, and by determining the similarities between background sensor readings for the already installed and the newly introduced node. This way, a location can be automatically determined in many cases.

In some other cases, the user may prefer to enter the location and other information, as was described for the first node to be associated with the network. If an installer does not know the password associated with a profile, he can still associate a new node with the network. This can be done either by performing a password reset procedure, as described in the above-cited U.S. patent application Ser. No. 16/527,826, or by proving to the system that the new node is co-located with the previously installed nodes. In this case, the system preferably performs verifications that the nodes remain co-located, e.g., by determining that the sensor data reported is correlated and that there are no significant communication delays or attenuation associated with an abnormal distance between the node and the other nodes of the network. Alternatively, the system may notify the user(s) of the network of the new node and ask for them to approve the addition before it is added to the network. This verification is similar to that described in the above-cited U.S. patent application Ser. No. 16/527,826, in that one or more rounds of verification is performed to resolve potential conflicts. A person skilled in the art will recognize that there are combinations of these methods that can be applied as well, and variations thereof.

As a node is integrated into a system, its network access needs to be enabled. Out of the box, a node does not know the credentials needed to access the local network, whether made up by WiFi, Bluetooth or other networking technologies. It is highly undesirable for nodes to be able to be connected without network security enabled, as many users may be tempted not to address this shortcoming after the nodes are connected; moreover, the time period during which the nodes are not secured would constitute a vulnerable period during which an attacker can infiltrate the network, establishing a man-in-the-middle attack or otherwise breach the local security perimeter. At the same time, most nodes will not have a user interface that is practical for entering complex credentials, and it is undesirable to tempt installers to use weak passwords in order to simplify the installation process. Credentials should furthermore not be communicated in plaintext to the nodes.

To address these and related problems in the context of a large-scale network of nodes with often limited user interfaces, and permit for fast provision, the disclosed technology involves nodes that are shipped with a serial number to which a key, and preferably a public key, is associated. This key is stored by the backend, and as the installer communicates the serial number to the backend during the registration of the node, the key is looked up in a database by the backend server, and sent to the device used for the registration. This device, such as the installer's mobile telephone, is assumed to be in wireless contact with the node being registered. This may be a Bluetooth, NFC or a WiFi connection for example.

Assume by way of example that it is a Bluetooth connection. As the installer device receives the public key of the node, it sets up a secure channel with the node, over which the network credentials are transmitted. This assumes that the installer user can enter the credentials on his or her device, or that these are stored. Alternatively, the credentials can be stored by the backend server, which instead of sending the public key sends the credentials encrypted by the public key of the registered node to the installer device, which then forwards the ciphertext to the node. In either case, the node received over the local wireless channel, such as the Bluetooth channel, the ciphertext. This may be signed by the backend server, or an associated server, in the case where the credential was stored on that server.

The node decrypts the ciphertext, and verifies digital signatures or message authentication codes where applicable, and then stores the credential in a local memory that is preferably not erased if there is a power outage. An example storage type is EEPROM, flash or other non-volatile memory. The node can now connect to the WiFi network, over the Internet, to a server associated with service provision. Preferably, for each local system, there is at least one node in charge of receiving and combining traffic to or from the different nodes on the local network in order to avoid duplication of sensor data being transmitted, and to compress and filter data before it is transmitted. One such filter is configured based on the privacy settings associated with the account, as indicated in the profile.

In an alternative embodiment, the node, as it is sold, stores in a non-volatile memory a public key associated with the service provider for which the server is contacted by the device of the installer. During the installation, the node communicates, using a wireless channel, to the installer device, an encrypted message corresponding to a symmetric key selected by the node, preferably using a true random method that bases its input on sensor data available to the node; alternatively, the symmetric key can be retrieved from storage associated with the node. The encryption is performed using the public key of the service provider.

The installer device receives this ciphertext and transmits it to the server, preferably using a secure channel set up between the device and the server as part of the log-in process of the installer to the service. The secure channel can use TLS, for example. The secure channel is associated with an account to which the node is to be associated. As the server receives the encrypted session key, and, using this key, responds to the node using the installer device as an untrusted proxy. The encrypted response comprises the network credentials associated with the account indicated by the installer device. In addition, it is beneficial for the node to transmit the unique identifier to the server. For one thing, this identifies the device and its capabilities, thereby enabling a configuration of the services associated with the account.

In yet another embodiment, the node stores a unique identifier associated with the node, and transmits a message to the server, using the installer device as a proxy, where the message comprises the unique identifier. This unique identifier is associated with a symmetric key unique to the node, and where the symmetric key is stored in non-volatile memory by the node as well as in a database by the server, where the symmetric key is associated by the server with the unique identifier of the node. Upon receiving the unique identifier, the server determines the associated symmetric key and uses this to establish a secure channel with the node, using the installer device as an untrusted proxy. The secure channel preferably comprises both symmetric-key end-to-end encryption and message authentication, where the latter can use a standard Message Authentication Code (MAC) such as a keyed hash function.

At least a portion of the symmetric key is used for encryption, and at least another portion is used for message authentication; preferably, these two portions are not overlapping. Once the secure channel is established, and the server has verified the identity of the node, e.g., by verifying that a message sent to the node is responded to correctly, e.g., using a MAC, then the server transmits, over the secure channel, to the node, the local access credentials for the node to access the local network such as the WiFi network, associated with the account that is indicated by the installer device.

It may sometimes be beneficial for the server not to know this credential. In such a case, the installer device may encrypt the credential using a key sent to the node, where the encrypted credential is sent to the server, and where the server transmits the encrypted key to the node, over the secure channel. Alternatively, the installer device can establish another secure channel with the node and send either the key or the encrypted credential to the node, and the other item to the server. A person skilled in the art will also recognize that a credential can be XORed with a one-time pad as well, where XOR denotes an exclusive-or operation, or delivered in part by the server and in part out of band for the server.

An alternative approach is to perform the configuration of the node, by the server, using the installer device as a proxy, where the connection between the installer device and the server at least in part uses a cellular connection. This can be done in the context of the various methods described above.

In another embodiment, the router of the network of installation site is configured to only permit traffic from devices that have the access credentials, except traffic to the site registering new nodes. This way, a new node can connect automatically to the server, identify itself using the unique identifier, and obtain access credentials for the network. In one alternative, the router accepts any traffic to the backend that provides the service to the node, and not only for registration purposes. In this case, no credential is needed. This can also be achieved by the new node contacting the server by routing its traffic via other, already registered nodes, that will convey the traffic to the backend.

It is beneficial for the local traffic to be encrypted. In order to do that, the nodes preferably share a symmetric key to be used for a secure channel, or multiple keys are shared between "endpoint nodes" and "star nodes," where the latter are in charge of collecting communication from the endpoint nodes and transmit portions of this to the servers, preferably after removing redundant information and modifying data to cohere with the privacy policies associated with the account. In these cases, the nodes still need to be accepted by the installer, or a resident, as belonging to the network. Such users can receive a notification from the server stating that new nodes have been added, but before they are allowed to contribute data and be controlled, they need to be accepted by the user, to belong to the network. This indication is provided by the user by connecting to the registration server and accepting the new nodes, and preferably also providing additional information such as a location designation, which can be a descriptor from a pull-down or other menu, or which can be user-entered text.

In one embodiment, each node stores, at the time of installation and using non-volatile memory, an identifier and a symmetric key. The identifier would be a unique number, such as a 32 bit number, and the symmetric key would be a number selected, at manufacture, using a random or pseudo-random process, and may be a 128 bit number. The symmetric keys are also stored in a large database, at the backend, indexed by the identifier. Alternatively, the symmetric key would be a one-way function of the identifier and a secret master key known only to the manufacturer, where the backend computes the symmetric key, provided the unique identifier, and access to the master key.

At installation, the identifier is communicated to the installer device using a wireless communication method, such as Bluetooth Low Energy (BLE) or using a visual scanner such as a QR code reader. The installer device communicates the identifier to the server, preferably over a secure channel. The server sends to the node a message, whether using the installer device or other nodes in the network as proxies, where the message comprises an encrypted WiFi network access credential corresponding to the network of the node, a symmetric key used for encrypted communication between nodes on the network, and a symmetric key used for message authentication and verification of authenticated messages, where the encryption uses the stored symmetric key known to the node. The node stores these values, after decrypting the message, using non-volatile storage.

The access credential needs to be updated for all nodes in case it is later changed; that process can be performed by a new credential being transmitted over the overlay network made up by individual BLE connections or similar, and encrypted and authenticated using the symmetric key for encryption and the symmetric key for authentication. If at any point a node is removed from the network, the remaining nodes may be sent updated keys, encrypted using the symmetric keys associated with their identifiers, which remain stored on each node, in non-volatile storage. If a node is added or removed, this may require some of the remaining nodes to be reconfigured by the server, e.g., to take fewer or more inputs into consideration when collecting input to be conveyed to the server.

In some instances, the installer may create an account, install a collection of nodes, and then transfer the control of the account to another party, such as a landlord or a resident. This can be done either by adding this party as a user, with the appropriate access rights, and then removing the installer from having access; or by the installer replacing himself of herself as the contact person with the new party to have access, e.g., by replacing the email address corresponding to the main contact and initiating a password reset, new ownership "code," or similar. A person skilled in the art will recognize that there are several variations of this. Another approach, however, is for the system to have one type of account that may be called 'installer', which comes with a very limited set of access rights. This type of party may, for example, be allowed to perform the following tasks:

1. Remove a node from the network, and initiate an automatic reconfiguration of the network by the backend server and/or nodes that remain in the network.

2. Add a node to the network and initiate an automatic reconfiguration of the network by the backend server and/or nodes that remain in the network. Preferably, the resident, the landlord or another "high-level" account accessor would get notified, and in one embodiment, would receive a notification to which he or she would have to respond in order for the inclusion of the node in the network to be completed.

3. Replace a node in the network and initiate an automatic reconfiguration of the network by the backend server and/or nodes that remain in the network. Preferably, the resident, the landlord or another "high-level" account accessor would get notified, and in one embodiment, would receive a notification to which he or she would have to respond in order for the replacement of the node in the network to be completed.

4. Combine two networks and initiate an automatic reconfiguration of the resulting network by the backend server and/or nodes that remain in the resulting network. Preferably, a resident, landlord or another "high-level" account accessor of each of the original networks would get notified, and in one embodiment, would receive a notification to which he or she would have to respond in order for the combination of the networks to be completed.

5. Split a network into two networks and initiate an automatic reconfiguration of the resulting networks by the backend server and/or nodes that remain in the resulting networks. Preferably, a resident, landlord or another "high-level" account accessor of the original network would get notified, and in one embodiment, would receive a notification to which he or she would have to respond in order for the action to be completed.

6. Change the privacy settings of a network. Preferably, a resident, landlord or another "high-level" account accessor of each of the original networks would get notified, and in one embodiment, would receive a notification to which he or she would have to respond in order for the action to be completed.

7. Add, change or remove a service associated with a network. Preferably, a resident, landlord or another "high-level" account accessor of each of the original networks would get notified, and in one embodiment, would receive a notification to which he or she would have to respond in order for the action to be completed.

To the extent that such changes can be initiated remotely, that is beneficial, and allows for remote maintenance. However, in such cases, it is important for the actions to be approved by a party such as the resident or the landlord before they are completed, or alternatively, initiated. A person with installer access to an account would not have access rights corresponding to unlocking or locking doors, control lights or sound, access video or sound, etc., unless such rights are specifically granted to the installer by the resident.

Performing control handover, as described above, involves creating a new entry for a user associated with a profile, where the profile in turn corresponds to a service account of one or more buildings or other spaces; and for the previous admin user to add the new user as an admin to the profile. Here, admin account privileges are different from, say, visitor accounts. There are different types of admin accounts in some embodiments, such as the following:

1. An installer admin account has the ability to add new hardware and configure the system as described above. An installer admin can add resident admins, tenant admins, landlord admins, but cannot add guests. If the installer admin attempts to replace or remove one of these types of users, and there already is such a user, or to add a user when there already is one, then the system preferably performs a conflict resolution as in the above-cited U.S. patent application Ser. No. 16/527,826. We also refer to the installer admin accounts simply as installer accounts; the admin clarification is to distinguish it from accounts with no admin rights, such as visitor accounts.

2. A landlord admin account has the ability to get basic safety stats, such as whether there is a fire risk, whether there is mildew or mold risk due to high humidity in the walls, and similar, but is not able to access microphones or cameras, determine when the tenant is present, etc. (except if such permission is granted by the tenant). The landlord admin account can add resident admins, tenant admins, landlord admins, where conflicts are resolved using a conflict resolution scheme as described above. We also refer to the landlord admin accounts simply as landlord accounts; the admin clarification is to distinguish it from accounts with no admin rights.

3. A tenant admin account has the ability to get basic safety stats and also use remote control, intelligent control, and other personalized features such as pet-watching services, using which the user can watch camera footage for selected rooms, or under certain conditions such as that there is no human user in the space, or no registered user at home. The tenant admin account can add roommates (with the same or lower access rights as the tenant admin), and guest users. We also refer to the tenant admin accounts simply as tenant accounts; the admin clarification is to distinguish it from accounts with no admin rights. We note that some tenant accounts may be associated with greater access rights than others, which can be achieved by bestowing only partial access rights to another person. Resident admin accounts are similar to tenant admin accounts combined with landlord admin accounts in terms of the enabled features and rights of such a user.

In one embodiment, an installer introduces and pairs a new device to an environment containing other sensor devices by accessing a profile associated with the other sensor devices (or "network"), proving physical proximity to at least one of the devices in this network, and then obtaining an identifier from the new device, communicating this to the backend maintaining the profile, and providing optional configuration information to the profile database. The backend determines the key associated with the new device by looking this up in a database indexed by device identifiers, and communicates configuration data to the new device, where the configuration data is preferably transmitted either via the installer device used to access the profile, and then from there to the device; or via the network. In the latter case, one of the devices in the network, sensing that it is in communication range with the new device, transmits the information wirelessly. The transmitted information is preferably authenticated by the service provider associated with the backend, and encrypted using the key that was looked up. The installer may be asked to provide additional configuration information, such as a label or an explanation, or a human-readable description of the location, etc. This is stored in the database associated with the network, maintained by the service provider; this database is part of the profile.

The risk of installation in a high density environment is associated with a risk of the network not being able to recognize property boundaries based on traditional household blue-prints, and therefore assigning a newly installed node to the improper network. To avoid such problems, in one embodiment, indoor triangulation is used to eliminate incorrect ownership assignment of new devices being installed next/close to an adjacent space (e.g., another apartment building or condominium).

In a one embodiment, the new device does not have an individual key, but only has a unique identifier and the public key of the service provider. The device, upon being installed, generates a key, preferably a symmetric key, using a random generator that may take as input sensor data associated with the device; and then encrypts the generated key using the public key of the provider, transmitting it to the backend either via the network or via the installer device, as described previously, after which the configuration proceeds as described for the other example embodiments.

In an alternative embodiment that minimizes manufacturing costs associated with individualization, the device does not have a unique identifier at the time of the installation, but receives one or generates one, and associates this with itself from then on. The identifier is stored in non-volatile memory. If the device does not have a unique key, it also can receive or generate this, as described above. For locally generated data, this is sent to the service provider using one of the available communication channels. It can be encrypted using the public key of the service provider, or a symmetric key generated on the device and encrypted using the public key of the service provider, after which it is transmitted to the service provider using one of the available channels. This approach simplifies the in-factory customization, as all devices are identical, or only have an identifier that describes their type, which is shared with other devices of the same type. A person skilled in the art will recognize that the different installation techniques and their components can be combined with each other to get yet other variations, and that this initially keyless and unique-identifier-less approach, for example, can be applied to other embodiments related to installation, and that any one of these can be combined with the other innovative aspects of this disclosure.

By accessing the portal, any person with sufficient access privileges can add other users of the same type, or replace themselves with such users, or remove themselves. Users can also add other users of other types. For example, an installer can add a landlord, a resident or a tenant. A landlord can add or remove a tenant. A tenant can add or remove a guest. In cases where limited sharing, such as of WiFi, is desirable, a user can create an account of a user who should be given such access, or simply select such a user and associate the access rights that are desirable. In cases where a change is potentially undesirable, as determined either by the configuration data provided at setup; that is hardwired in; or as is asserted by a user with sufficient access rights for this, all such changes initiate a notification or a verification; the system may also require a response or a time-out before the requested change of this type occurs, where the response is received from one or more users that are notified or which participate in the verification.

Notifications preferably describe the changes and the associated access rights associated with the impacted parties, and include a warning in situations where the request is potentially high-risk based on contextual information such as location of the requester, volume of requests, etc.; or undesirable. The association of a user with access rights may be limited in time, require periodic renewal to remain in effect; require periodic use of the granted resources, etc.; and may be temporarily or permanently blocked by the system based on fraud-detection methods identifying potential risks, such as likely cyber-attacks, actions performed by black-listed users or users with low reputation due to previous abuse, and others.

In the above, a node/device may comprise a single sensor device, or a collection of sensors. These may be in the form of an outlet, a circuit breaker, a switch, a light fixture, a router, a smart home appliance such as a connected refrigerator, a smart security appliance such as a glass break sensor or door sensor, a connected camera, etc. It can also be in the form of drywall with incorporated sensors, and a wide variety of other arrangements involving "smart dust" or embedded sensors.

One benefit of this disclosure is a new type of structure that enables services relating to the deployed network of nodes. The backend is configured to collect and classify sensor data and to enable remote control of outlets and switches, and to appliances associated with these. The remote control is either manual, e.g., involving an authorized end user changing settings and thereby modifying the configuration for the associated space; or automated. Automated control corresponds to intelligent control influenced by the inferring of preferences and needs. In addition, another type of service involves surveillance, e.g., for purposes of detection of burglary, or of sensor data associated with risk. For example, the system enables the automated detection of earthquakes followed by an automated but preferably selective modification of the power supply, to minimize the risk of fire associated with broken gas lines, while maintaining basic services such as wireless communication and lights to guide residents and visitors out of the space in the safest possible direction.

Some of these services may be included in subscriptions, while others are provided for free with the purchase of the hardware; yet others may be maintained and potentially billed by third-party vendors that use the provided infrastructure or portions of the data it generates to offer value-added benefits. Such services can be built very much along the lines of how apps are produced for smart phones, and can be provided by a party associated with the hardware, the maintenance of the backend connected with the hardware, or by service providers with a feed of data from the backend. This feed of data does not need to contain the raw sensor data reported from the installation of nodes to the backend, but could be processed by the backend before it is provided to third parties. This enables the service providers associated with the backend to protect the security and privacy of the system and its users and only share anonymized data or non-sensitive data, such as predicates associated with pseudonyms. This novel structure and data sharing model opens up tremendous opportunities for innovation and service provision, and can be used at the side of services provided directly by the service provider associated with the backend.

The system further enables profit sharing between installers or subsidizers and service providers, wherein installers and subsidizers obtain benefits (whether monetary or in terms of data, or both) in response to the generation and processing of data, and the monetization of the same. It is, for example, enabling a party who subsidizes the sale of equipment to be associated with the hardware, e.g., using the unique identifier used when the hardware is installed, and, as a result, obtain a pre-negotiated benefit associated with the use of the subsidized hardware or the network of nodes in which it is installed. One such benefit is to obtain usage data, demographic information, or leads associated with the use of the hardware or associated node network; another is to connect services to the network, such as a product search feature that is part of a voice-driven user-facing functionality. Another type of benefit is profit sharing for paid subscriptions, revenue from delivery of data to third-party apps, revenue from sales of apps related to the subsidized equipment, and the like.

These financial considerations will lower the cost of ownership and are enabled by the disclosed structure. The subsidizers may be a landlord, a trade organization, a national home improvement store to give a few installers. Benefits can also be developed for installers, e.g., electricians, where the person or company installing some hardware may receive a benefit when a subscription or paid service is enabled or used, or who may be contacted by the system when repairs, maintenance or additions are desirable; this is a valuable benefit to installers as it changes a one-time installation event to a potential customer relationship.

Other incentive structures include service sharing. The system may be configured to share services (such as power provision for charging of electrical vehicles or sharing of Internet service) at a metered or flat rate, provided to third-party users, and wherein the system acts as a middleman that charges the third-party user and pays the property owner/resident/installer/subsidizer, etc. All security and access control associated with the provision of services would be managed by the service provider associated with the backend of the system.

In one embodiment, the system determines that a circuit is used for charging of a battery, such as a car battery of an electric vehicle (EV), based on a pattern of energy consumption and resistance, which is characteristic for charging. The system then determines, based on the energy consumption and/or resistance at any point in time and historical charging data associated with the circuit, how much more energy needs to be provided to the battery before the battery is charged. In one embodiment, this is achieved by varying the output voltage and determining the energy consumption for two or more voltages. This enables the characterization of the battery to be charged, and the automated distinguishing between two or more potential EVs and their corresponding batteries; it further allows the selection of the associated predictive curve for charging. This is used to determine the remaining charging needed. Instead of users setting a time when charging should commence, they can therefore set a time when charging should conclude, allowing the system to optimize the time of the day during which charging is performed to coincide with low-use periods, low-cost periods, etc.

A similar automated characterization of movable electric devices, such as lamps and mobile appliances, can be performed. By determining the response of the device to varying voltages, and by determining the power consumption profiles of devices, the system identifies devices. As one device is unplugged from one outlet and plugged in to another outlet, the system can therefore re-identify it, allowing a remote control of the device to be associated with the device as opposed to the outlet. Practically speaking, this means that a movable lamp, fan, etc., is unplugged from one outlet and plugged into another, the system can detect that it was moved, and reassociate it with the same control. Another slave network device would be a home appliance (e.g., fridge, stove) which by their operational nature share the 'Power consumption profile DNA' used for both identification and node management.

A remote control of the device, e.g., implemented on an app running on a portable device such as a phone or smartwatch, can then identify what outlet the device is connected to and re-associate the control of the device so that the same remote control user action keeps modifying the state of the same device even after it is moved. This determination is also aided by a determination of the location of the user, as described in U.S. patent application Ser. No. 16/585,438, filed Sep. 27, 2019 and entitled "Methods and Apparatus for Determining Preferences and Events and Generating Associated Outreach Therefrom," which is incorporated by reference herein in its entirety.

The use of an infrared (IR) sensor in one or more nodes is beneficial to detect the use of remotes, and to determine, based on the received sequence and a look-up table of codes used for various brands of equipment, what the meaning of the received sequence is; what type of equipment is being controlled; and whether any additional actions should be taken. For example, the system may automatically power down a DVD player when not used, and not return power to it until at least one of the TV or the DVD player is being controlled by a user using a commercial off-the-shelf (COTS) remote not associated with the network. This also serves to extend the reach of the COTS remote, as the user with the remote may be in another room than the equipment controlled. The system determines the requested action as described above, then replays the IR sequence in a location closer to the equipment being controlled. If this location is not known, the sequence can be repeated in multiple locations within the node network.

The replaying of the sequences is possible since a node close to the equipment can activate its built-in IR transmitter to send the signal. It is also possible to retransmit the signal using another type of signal, such as Bluetooth; this is beneficial in the context of equipment that can receive both Bluetooth and IR, and especially if the equipment to be controlled is located in a space where the IR signal is blocked, e.g., by furniture. Furthermore, a smartphone or other consumer device can be used to send remote control signals, whether to equipment that traditionally is controlled by remotes, or other equipment.

At least one node receives a signal sent using an app on the smartphone or other device, interprets the signal based on a system-specific lookup, translating the received signal to an equipment-specific signal, whether IR, Bluetooth or other, and transmitting the translated signal in at least one location, causing the controlled equipment to change state. In some instances, this equipment first needs to be powered up. For example, a DVD player may have had its power automatically cut. The system automatically powers the DVD player up by turning on the power for the outlet the DVD player is connected to, as one node in the TV room detects the presence of a person; the remote is used to select an action related to the TV or DVD player, or another triggering action takes place.

After the DVD player has been given time to start, a signal is conditionally sent to it to control it, where the condition relates to the requested user action. For example, a user who clicks an in-app personalized button to power on the TV and the DVD player would cause the outlet powering the TV to be turned on, the outlet powering the DVD player to be turned on; and after some period used for booting up (and which is known based on the type of equipment, stored in a look-up table), then remote control commands are sent to the appropriate equipment in the associated locations to start them, and to set up the TV to receive a signal from the DVD player. In an alternative version, the DVD player and the TV are both provided power as soon as a person enters the TV room, and for ten minutes after the last person leaves, having turned off the equipment before leaving.

The signal from the smartphone or other device can be transmitted using any wireless signaling, e.g., WiFi, Bluetooth and other, as supported by the smartphone or other device. The system knows what equipment is present based on at least one of detecting signals from remotes; from receiving configuration data from a user or installer person; and from receiving configuration information from a manufacturer or party selling the equipment. Similarly, a remote can be used to control a fan. The system can automatically turn the fan off if the user leaves the home. The system also preferably turns off the power to the fan to reduce the consumption of phantom power, as described for the DVD and TV example above as well.

The installation of a set of nodes associated with a space preferably starts with the creation of an account by the installer. This account may be shared between multiple collaborating installers, or may be used by a single person. The installer may include a user, such as a landlord, resident or other, before the installation commences, or may add such users afterwards. The creation of an installer account is similar to the creation of another type of account. One difference is that the installer may identify the type of user he or she is, namely, an installer, which preferably allows full access to the system before a resident or landlord user has been added, for purposes of testing, and which may be automatically limited in terms of its capabilities and access once such a user has been added. The limited capabilities may allow installation of additional nodes, the execution of general test suites, and an optional notification of system maintenance needs, if determined to be wanted by the landlord/resident or other admin user.

One important aspect is to enable an installer to test the system, whether by running automated test suites, which can be provided as macros and made available to anybody with installer-type access credentials, or by enabling limited access during a time of installation, e.g., for a duration of 72 hours after a node is configured.

To install the first node, the installer connects it to power, and enables a network access by the node to the backend server associated with the installation, where this access can be enabled via a device the installer uses or via an already available WiFi network to which the installer provides a password or other access credential directly to the node via the installer device or indirectly to the node via a connection to the backend server connecting to the node, which can take place via the installer device or an alternative channel. The node and the backend server establish a secure channel and exchange configuration data. The backend server associates the node with a space, also referred to an installation or a node network. The node stores data in a non-volatile memory, including WiFi credential data. The node may receive and store information relating to multiple WiFi networks, including Service Set Identifier (SSID) information and credentials, along with an optional ordering corresponding to what network to prioritize over the others.

To the extent that such WiFi data is not available, the node can be configured in a manner that enables a communication channel that is proxied by a device with a cellular radio, such as a cell phone or a tablet with SIM card, allowing communication to be conveyed over that channel. This channel can also be one of multiple accessible communication channels, and preferably with lower priority than WiFi networks. This is beneficial in case there is an Internet outage. The communication can be limited to emergency data and very restricted, small or infrequent status data. Wired networks can also be used if at least one of the nodes in the network is connected to the Internet, as will be understood by a person skilled in the art. In one embodiment, the backend will be notified if regular Internet access is lost. Then, the backend preferably notifies an admin or other user associated with the space of the outage.

A user preferably updates a router password not by changing it directly at the router, but instead, by logging in to the portal associated with the user profile and the space and updating the password there. As the update request is received by the backend, it is transmitted to one or more nodes associated with the space, and one of these nodes accesses the router, mimicking a user login, and changes the password according to the user request. If a user introduces a router with a default password into the network, the new router is detected by at least one of the nodes, which notifies the backend. The system determines whether the new router uses the default password by attempting to log in to it via one of the nodes, using the default password; if that is successful, the system preferably generates a notification to one or more users associated with the space, asking the user if this new router should be automatically protected. If the user agrees to this, e.g., by clicking a "yes" button and optionally by providing information about the router, such as its serial number, firmware revision, model number or MAC address, then the system updates the router password with a secure password generated by the backend system, or alternatively, using the same password as used for another router already associated with the system.

The benefit of requesting router information is that this enables the system to verify that the router is likely in the possession of the user, thereby avoiding accidental updates of neighbor routers. The system can verify that the provided number is likely to be associated with the newly detected router by looking up the information and determining whether it is associated with the type of router that was detected. If there is not a match then the system does not update the password. The benefit of managing passwords of the routers, and of other devices, through the system is that of a unified security system. This applies both to access passwords and admin passwords.

In addition, the system can provide WiFi access to any device by setting configuring nodes to allow access to the WiFi to any user matching a policy, including being a registered guest, being an approved guest, having an account, performing a task, and the like. The node can proxy WiFi traffic it receives to the router, and then to the Internet, since the nodes have access credentials for the WiFi network. This makes regular access password not important for the user to know. The user also does not need to remember the admin password, as he or she only has to be able to log in to the portal and access the WiFi configuration functionalities offered by the system. Therefore, the system can use long and complex passwords, making the router, and its connected nodes, more secure.

A neighbor of a user can allow the system to use his or her WiFi system, whether in emergencies or at any time, but without allowing the system to control the security of his or her router. Therefore, the system will not offer to maintain the security of routers to which it does not have the admin password. To the extent that the user generates passwords that are stored by the system, as described above, the system preferably verifies the strength of the passwords and requires a minimum level of security, using one of the available password strength methods, and as understood by a person skilled in the art.

In an alternative installation process, nodes detect that there is a pre-existing node network as they are first powered up after having been connected. This can be done by scanning for an SSID indicative of a node network, by scanning for MAC addresses in the range of the node devices, or by always sending out a request to join such a network, and if these are responded to by already installed devices (that have to scan for such requests) then this implies detection. As a node network is detected, the newly installed node will attempt to join it. It will create a WiFi connection to an open portal associated with a node it has detected as belonging to the node network, and request to join.

The previously installed node will then create a secure channel between the newly installed node and a backend server, and the newly installed device will be configured as described above. In one optional embodiment, a newly installed node will only be tentatively connected to the network, and not configured; and then, an admin associated with the network will receive a message requesting whether to add the node or keep it in quarantine. If this is responded to in the affirmative, e.g., by clicking a "yes, add this node" button, then the configuration proceeds. Alternatively, the two nodes can verify with the installer whether the configuration should be performed. The new node may present an audio message to the installer such as a periodic beep, while the already installed node may produce an audio message "Do you want to add the beeping node to this network? If yes, please say 'add node', otherwise say 'cancel' or wait for a minute." Discovery of other nodes can be done using WiFi but also using alternative communication methods, including but not limited to Bluetooth, Zigbee, sound-based communication, and overlaying a signal on top of the electricity feed. Similarly, nodes can communicate with each other using one or more of these and related methods after the installation and configuration stage, as part of the regular operation of the system.

In one embodiment of the system, the installer has no network connectivity during the installation of one or more nodes. In one example context, the installer uses a mobile device such as a mobile telephone with a dedicated installation app on it to set up individual nodes, but is not able to communicate with a backend server during the installation process. As the first node is installed, whether the installer has a network connection or not during this time, the first node is associated with a space. Here, a space corresponds to a label created by the installer, and preferably comprises a machine-readable unique identifier, such as a long random string or a public key generated for the purpose of being associated with the space; the space preferably also corresponds to a human-readable label, such as "John's house." This information is stored on the installer device, such as a smart phone.

The first node is associated with the space, e.g., by the installer powering it up while keeping his installer device in the presence of the node, and by selecting an indicator associated with the space in the app. In addition, the installer may need to provide some validation in order for a new node to be added to the space, such as responding to a challenge. One challenge is to direct the camera of the smart phone to the device, where the device emits a series of light pulses and also transmits information relating to these pulses over the radio, and where the smart phone determines that the two series are correlated, and therefore that the correct node is added to the network associated with the space.

As additional nodes are installed and powered up, the new nodes can detect the wireless network formed by the previously installed node and automatically join the network. Optionally, a challenge such as that described above can be used to validate nodes before they are added to the network. As a new node is added to the network associated with the space, the new node is provided with information relating to the communication channel set up for the other nodes, allowing them to communicate directly with each other; this is preferably a secure channel, e.g., a communication channel that uses encryption and message authentication.

In addition, the installer device collects information regarding this network, optionally how to access it (e.g., keys or credentials used), and optionally public keys or other identifiers associated with the node network. This information is stored and later submitted to the backend, preferably in an automated manner, e.g., by all the information being bundled up in an encrypted tar file, authenticated and sent to the backend. Such information enables the creation of a hardware profile by the backend server, related to the node network. Once the node network is connected to the Internet, a connection is (preferably automatically) established between the nodes of the node network, whether one by one or collectively, to the backend server, after which the configuration process proceeds in the manner similar to that described in the context of a network with an Internet connection.

The disclosed technology provides substantial improvements over the prior art, including the well-recognized approach proposed by F. Stajano and R. Anderson, "The Resurrecting Duckling: Security Issues for Ad-hoc Wireless Networks," in Security Protocols, $7^{th}$ International Workshop Proceedings, Lecture Notes in Computer Science, Springer-Verlag, 1999. In the Stajano and Anderson approach, a new node can mistakenly join the wrong network, especially in congested areas where many networks overlap. This is addressed, among other things, in the disclosed technology by using an installer device as a proxy that is involved in assigning to a network a newly installed node; and by the alternative or complementary approach of using a dramatically reduced signal strength for the communication between a recently installed node and one that has already been assigned to a space (or node network). Additionally, the use of challenges to prove physical presence helps overcome misattribution. It is important to ascertain that the proper network is joined, even in the presence of a malicious entity, in order to establish and maintain the integrity of the system. A person skilled in the art will recognize that there are many other additional differences and benefits associated with the disclosed technology.

In one embodiment, a newly introduced node transmits, using a wireless signal, data to nearby nodes belonging to a network. In a crowded environment, it is possible that the signal is received by multiple nodes belonging to two or more node networks, which could be administered by different users. The newly introduced node should only be incorporated into the proper network. Each network that detects the newly introduced node presents information to an admin of the node network in a user interface, describing the node. The description may be a human-readable description of the node (e.g., "a switch") and it may contain a likely location (e.g., "installed close to outlets labeled 'TV room'") along with a time of detection (e.g., "first detected on September 14 at 11.42 am"). In addition, the notification may include a challenge for the admin or a person associated with the admin (e.g., "flip the switch on and off, then speak the passcode 'Green juicy flower' to the switch" or "connect a light fixture to the outlet, turn it on and off eight times," or "listen to the keyword spoken by the node and enter it into the portal"). This is used to let the node determine what network to join.

At the same time as the user identifies this, the welcoming networks will set up secure channels with the newly introduced node and transmit over these channels information corresponding to the challenge. The newly introduced node thereby selects what network to join. Alternatively, each network for which one or more nodes detect the newly introduced node may send a response using a wireless signal. This response would preferably contain a unique or semi-unique identifier. If the newly introduced node only receives one such identifier in response to broadcasting its presence, within some preset period of time from when it is first powered on, such as ten minutes, then it automatically decides to join that network.

To join a network, the newly introduced node, using a secure channel with a node in that network, will obtain configuration information, whether via a node in the network and sent from the backend server, or from a node in the network, storing suitable configuration information for the purposes of configuration of new nodes. In addition, the network collects information about the newly added node and transmits this to the backend. When the admin of the network net logs in to the portal, he or she is notified of the added nodes and is asked to provide nicknames ("master bath GFCI outlet," "TV room light switch," "kitchen counter left side switch"), and optionally provide information about the load from a pull-down menu ("powering the refrigerator," "refrigerator brand is Samsung," etc.) along with other information ("allow remote control," "do not save energy by powering off when nobody is present," "only power when it is dark outside," etc.) This configuration is similar to the configuration performed when the newly installed node is introduced into the network in another alternative manner.

Additional illustrative embodiments will now be described with reference to FIGS. 1 through 8.

FIG. 1 shows a typical node installation procedure. In step 101, the installer connects a device to power. The device is also referred to as a node. The device has a non-volatile memory that preferably stores information indicating that it has not yet been installed, and therefore, the device initiates a local installation process. The installation process can optionally also be initiated by the installer using a handheld device or a computer to initiate the installation process. We refer to these collectively as the installer device.

In step 102, the device creates a wireless connection. This connection can either be to another network device that has already been installed, or to the installer device. Whether another device or the installer device is connected to, this connected device is used to set up a communication channel between the device and a server associated with the service provision. Optionally, the device can connect directly to a server using a cellular modem associated with the device. These and other similar servers in illustrative embodiments herein are also referred to as "backend servers."

In step 103, the installer connects to the server. Preferably, the installer needs to create an account or log in to an account to access the information associated with the installation. If there is no profile associated with this yet, the installer can perform that setup. Login can be performed in a variety of ways, including using passwords, tokens, biometrics, and/or other types of authentication factors. To the extent that the installer is associated with multiple networks, e.g., each one corresponding to a customer, the installer needs to select the network and the associated profile and provide some access credentials before access is granted.

In step 104, the device and the server perform key establishment. This may use key transport or key exchange, and may or may not be mediated by the installer. To the extent that the device already stored a key in its non-volatile memory, this needs to be communicated to the server. To the extent that there is no such pre-stored key, a key is generated by either the device or the server, or by both, as in the case where key exchange such as Diffie-Hellman is used. The key establishment preferably involves at least one of a pre-stored key that is used to prove, by the device to the server, its identity; and a key that is generated using key exchange or key transport using a public key of the server stored on the device. Such a key is stored both on the device and in a database associated with the server, or is generated from data that is stored on these entities or associated entities.

In step 105, a unique identifier is generated and assigned to the device, should that not have already been performed as part of the manufacturing process. This identity is stored in the database associated with the server, and allows data and state to be associated with the unique device. All data communicated between device and server is preferably communicated over a secure channel bootstrapped by the key(s) from the key establishment phase. The indication that step 105 is "optional" in this embodiment should not be construed as an indication that other steps are required in this or other embodiments.

In step 106, the device is configured. This may include providing it with access credentials to the network into which it is installed, as well as providing other devices in that network with information relating to the installed device. To the extent that a device receives configuration data, this is preferably stored in its non-volatile memory.

In step 107, the database associated with the server is updated to include data about the device in the profile selected by the installer, or, optionally, determined by verifying that the installed device is capable of communicating with at least one node in the network into which it is installed. If the installed device is the first device of the network, this latter functionality is not applicable.

Figure 2:
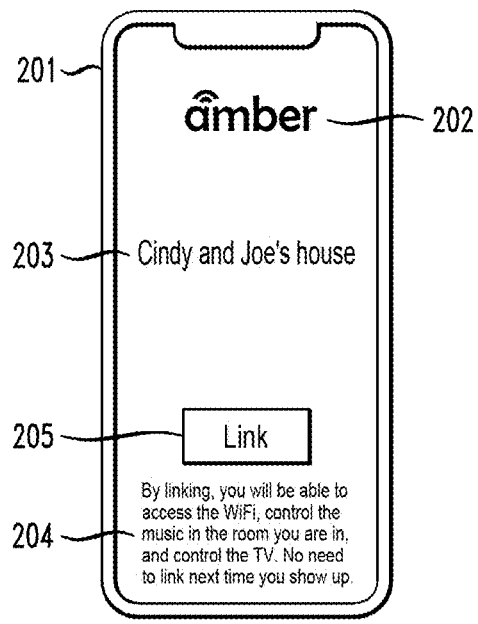
FIGS. 2 through 8 show example user interfaces of a mobile telephone utilized in conjunction with configuration and management of smart nodes with limited user interfaces in illustrative embodiments.

FIG. 2 shows a device 201 that is used by a guest to access a service. The guest has previously downloaded the app corresponding to providing service access, and has opened this app. The app identifies the name of the service provider in 202, the name of the space in 203, an explanation of benefits in 204, and a clickable button 205. In an alternative embodiment, this functionality is not provided using an app, but a webpage instead, where the webpage accesses a description of the local network, provided by a captive portal associated with the WiFi provision associated with the space.

Figure 3:
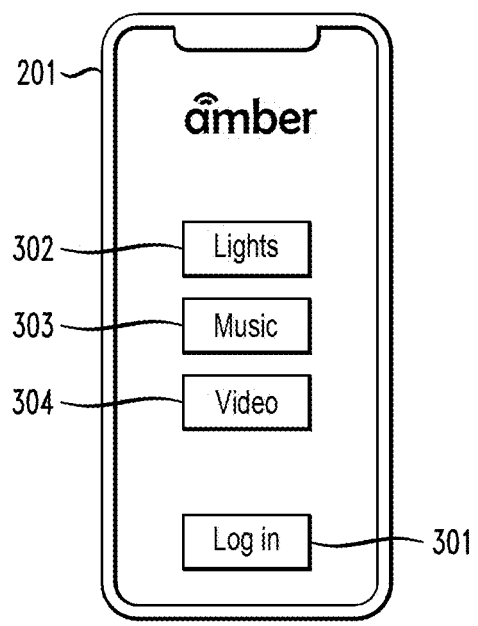

FIG. 3 shows what the user might see after pressing the clickable button 205 to gain access to the network. The example shows button 302 to control at least some of the lights associated with the space, but preferably only while the guest user is present in the space, which can be determined by recognizing the MAC address of the device 201, which is recorded as the user joins by clicking clickable button 205, along with other machine identifiers. The WiFi network preferably determines that device 201 is present based on detecting its MAC address or other hardware identifier, or by detecting the use of the app or personalized webpage associated with the guest user, where this generates traffic conveyed by the local network. When the guest user is determined to be present, button 302 is shown or is made active, which can be shown by use of color. When button 302 is active, the guest user can click it and control at least some of the lights associated with the space.

In an alternative embodiment, the system does not require that the guest user is present, as detected above or in an alternative manner, but allows access to the light controls independently of the location of the space, for example, based on a GPS location, based on the time of day, based on a policy set or selected by an admin, or other parameters. The other buttons have similar access control features, but not all buttons need to have the same access control. For example, it is possible for the guest user to click button 302 for controlling lights at any time the guest user is determined to be present in the space, whereas button 303 to control audio associated with the space can only be controlled by the guest user when the guest user is determined to be present and the local time is between 8 am and midnight.

The button 304 to turn on the TV or other related equipment, or control the channels, can have the same or different access control policies associated with it. An admin can select what types of access guest users have, whether across all guest users or on a case-by-case basis. Some guest users, for example, may only be granted access to the button 302 to control lights, but not to buttons 303 or 304 controlling music and video, in which case buttons 303 and 304 are preferably not shown, or shown in another color to indicate that they cannot be engaged. Button 301 can be clicked for the guest to log in to an account. If the guest user does not have an account, he or she will be asked to create one after clicking button 301.

Figure 4:
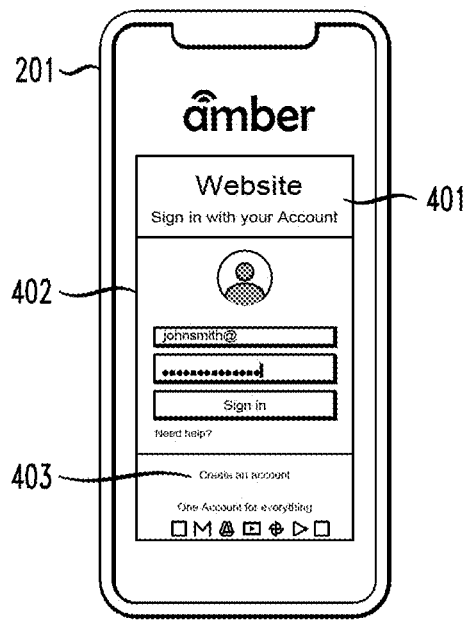

FIG. 4 shows an example login. This example utilizes Google's Open Authorization (OAUTH) services, as indicated by information 401, but can also be used with the OAUTH services of other identity service providers, and could also be a standard username-password login page associated with the service provider 202. The display of device 201 shows the OAUTH login screen 402. The guest user has just entered his or her user name and password in this example, which happens when the guest user is not already logged in to the service 401. If the guest user is already logged in, he or she sees the information shown in FIG. 8 instead. If the guest user does not have an account with provider 401 then he or she can create an account by clicking button 403.

Figure 5:
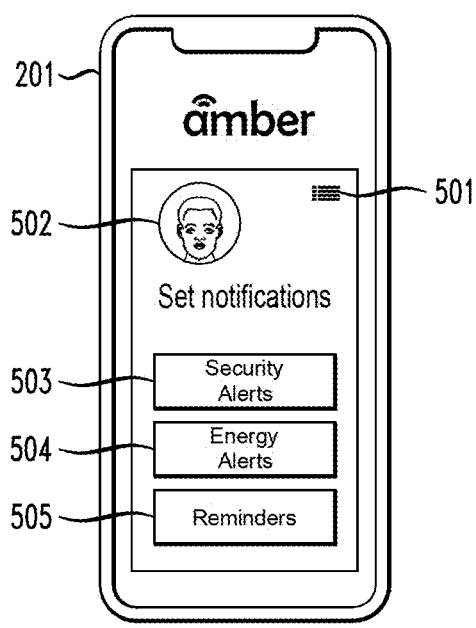

FIG. 5 shows a configuration for a user. A user, including a guest user, who has created an account can configure it. Some limited configuration can also be made for users who have not created accounts, as they can be associated to the MAC addresses and other hardware and software identifiers associated with their devices. Icon 501 corresponds to a clickable button that takes the user to a menu of options in the webpage or app executing on the device 201. The user may be represented in an optional icon 502 if he or she has created an account and uploaded or taken a photo, or otherwise selected a photo or other representative image. The user is also shown a collection of buttons 503, 504 and 505. Button 503 takes the user to a menu of security alerts that the user can set notifications for, e.g., being notified if the front door is opened. The notifications can be performed using email, SMS, in-app notifications, phone call or other alternative messaging methods. This type of notification is not available to all users associated with the space, and may not be provided to guest users, and only to selected other users, where the selection may be performed by an admin associated with the space. The button 504 provides energy alerts, such as that the A/C is running while nobody is at home or that $10 of electricity has been consumed since the last cost notification.

Button 505 allows the user to set reminders, such as a reminder to leave for work at the normal time, whether detected by the system or input by the user, or a reminder to turn the home to energy saving mode once the alarm system is armed. Some of these reminders may be available to guest users, as controlled using a policy that is set or selected by an admin associated with the space. A person skilled in the art will appreciate that these are simply example buttons and associated example functionality. A user who has registered for an account and associated this with the space, and who has sufficient access rights according to a policy may need to log in to the account associated with the space, as shown in FIG. 4, in order to access the menu options shown in FIG. 5.

Figure 6:
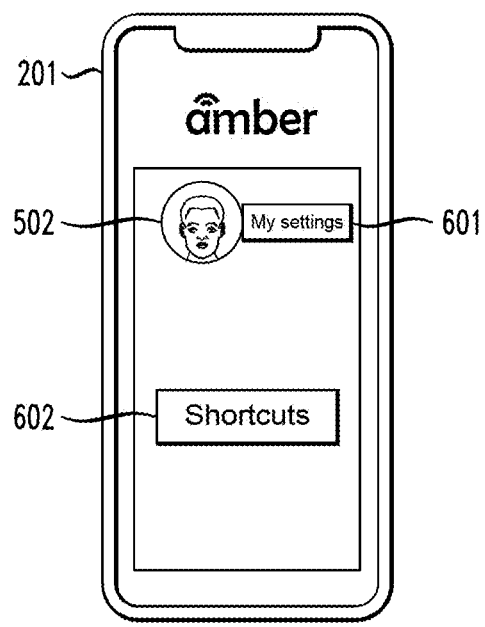

FIG. 6 shows an alternative or additional menu of user options, comprising a button 601 that allows the user to control his or her settings, and a button 602 that allows the user to access his or her shortcuts. One example shortcut causes the TV to be turned on, the volume to be set to 25, the lights in the TV room to be dimmed to 30%, the music playing on the speakers in the TV room to be turned off, and the channel switched to PBS. Another example shortcut causes the TV to be turned on and the channel chosen to ESPN. A user without an account can also set shortcuts, e.g., by clicking button 601, and then access such shortcuts by clicking button 602. In one embodiment, a user without an account would not be represented by icon 502, whereas in another embodiment, he or she would still be allowed to make such configurations based on being recognized using the MAC address of the device. However, a user with an account can access the service using two different devices, such as device 201 and a second and different device, and can access the configurations created using one device 201 from another device. This can also be achieved if two devices without accounts have been associated with each other, e.g., by a pairwise entry of the same data, the synchronous moving of the two devices while placed in association mode in the app, and the like. It is preferable, however, for the user to create accounts as this allows the user to replace his devices without losing configuration data, and without having to synchronize the devices.

Figure 7:
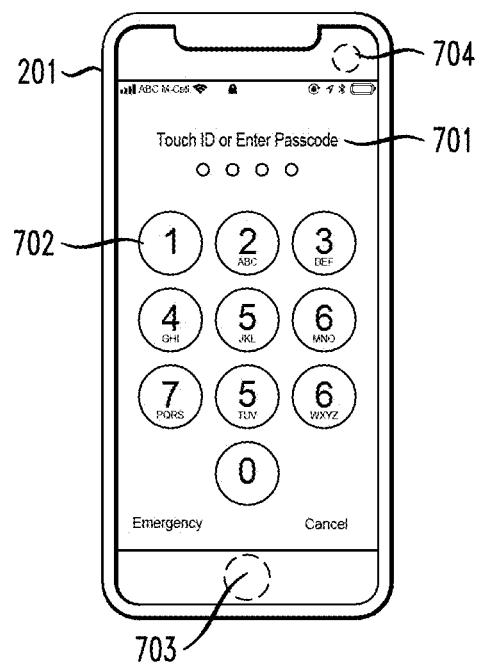

FIG. 7 shows an example user experience as the user access an app provided by the service shown in FIGS. 2-6. Using the built-in authentication support, or alternatively, using an authentication mechanism associated with the app or webpage, the user is instructed 701 how to authenticate. In this example, the user is given the options of entering a PIN in PIN pad 702 or using a biometric sensor to authenticate, where example biometric sensors comprise fingerprint sensor 703 and camera 704 associated with device 201.

Figure 8:
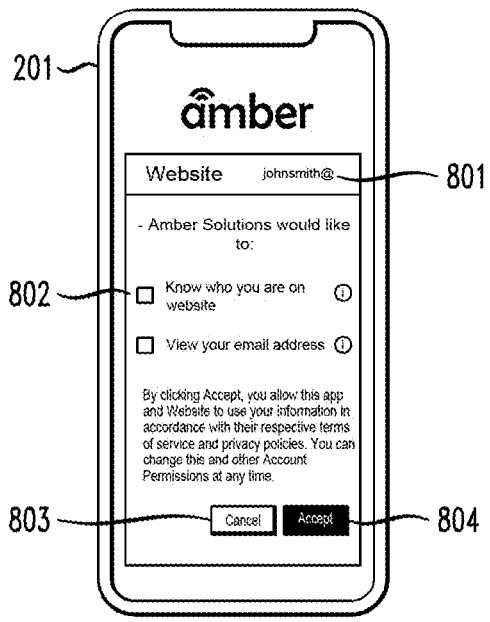

FIG. 8 shows a part of the OAUTH access request that is part of the association of an external account such as a Google or Facebook account, with the access to a portal associated with the shown app or webpage and the space. The example OAUTH login screen corresponds to an account 801 that the user is logged in to on the device 201, and provides an indication 802 of what access is requested, a button 803 to cancel and a button 804 to accept access. If access is accepted, the account 801 is associated with the app or webpage shown on device 201.

Figure 9:
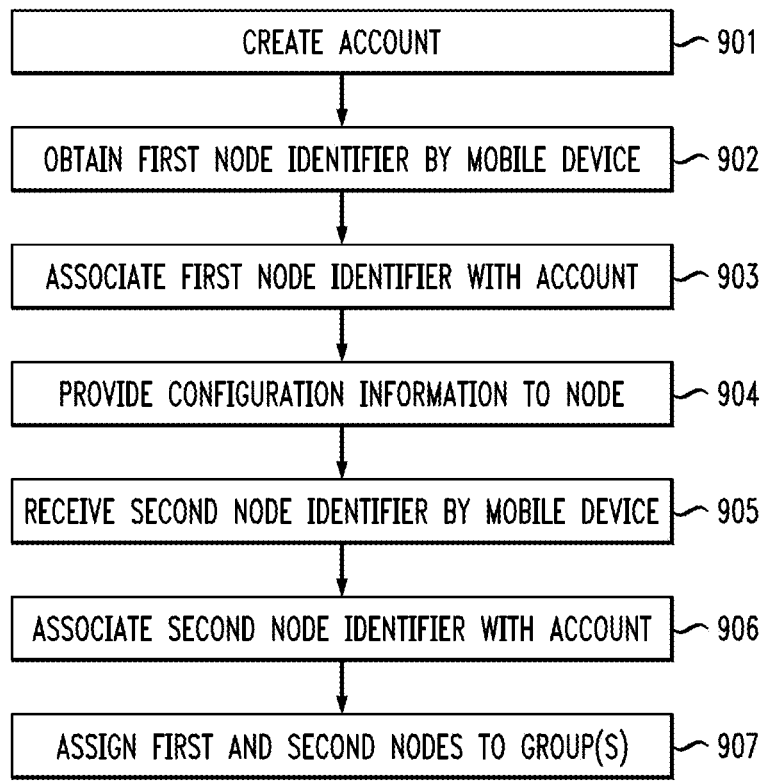
FIGS. 9 through 12 show additional examples that involve configuration and management of smart nodes with limited user interfaces in illustrative embodiments.

FIG. 9 illustrates the flow of a typical installation process. In step 901, an account is created. This may be created by an installer using a mobile device, such as a phone or a laptop, or using a desktop computer. To create an account, the installer selects a user name which may coincide with an email address or a phone number, and sets a credential, which may be at least one of a PIN, a password and a biometric.

In step 902, a first node identifier is obtained by a mobile device used by the installer. For example, the first node identifier may be expressed as a barcode, a QR code or another machine-readable value, where the node identifier may be printed on the node, or a label associated with the node. Here, example nodes include outlets, switches, breakers, an LED lightbulb, and nodes that are part of appliances such as a refrigerator, a Roomba™ vacuum, or an Amazon Echo' unit, as well as numerous others. The node identifier may also be transmitted by the node to the mobile device using a radio signal such as a BLE signal, or a sound signal, or encoded by the blinking of a light associated with the node. The mobile device would obtain the signals related to the node identifier using a matching sensor, such as a camera, a radio, a microphone, and associated software to process the signal. The node identifier would preferably be associated with the node by a manufacturer, such as an original equipment manufacturer (OEM), or a company that white labels or distributes the nodes, and would preferably be unique and associated with a key.

In step 903, the node identifier is associated with the account. This can be done by the installer having selected the previously created account, logged in to this account, or installed an app used for the installation wherein the account user name has been entered or selected. When the node identifier is associated with the account, a record associated with the account is updated to include the node identifier. This record may be maintained in a central location, such as on the backend of a service provider that is communicatively coupled with the mobile device of the installer. The record may additionally or alternatively be maintained local to the installation, such as on at least one of the nodes, on a local gateway or computer, or on the mobile device used for the installation.

In step 904, configuration information is provided to the node. This configuration information may be communicated from the backend to the mobile device and then to the node, or it may be communicated from the backend to an already installed node which then communicates it to the node, or it may be communicated from the mobile device or a local gateway or computer to the node. The configuration information may comprise, for example, credentials such as WiFi credentials to access one or more local networks; information relating to other nodes associated with the account; or a request for the node to confirm the completion of the installation by generating a response. After the completion of the installation, the node would not be in a state of allowing itself to be paired with a new account, although an admin can selectively place a node in that state by making a selection that modifies the data stored in the record associated with the account and which also causes the generation of a message to the node.

In step 905, the node identifier of a second node is obtained by the mobile device, and the node identifier is automatically added to the account in step 906. In step 907, two or more nodes are associated with one or more groups. An example group corresponds to a set of nodes in one room, a set of nodes with a similar purpose such as nightlights in a residence, or a set of nodes associated with one use such as cooking or watching TV. The record associated with an account corresponds to a profile and is stored on the backend, locally, or both. A backend entity such as a backend server may be implemented using cloud computing methods, as is well understood in the art.

Figure 10:
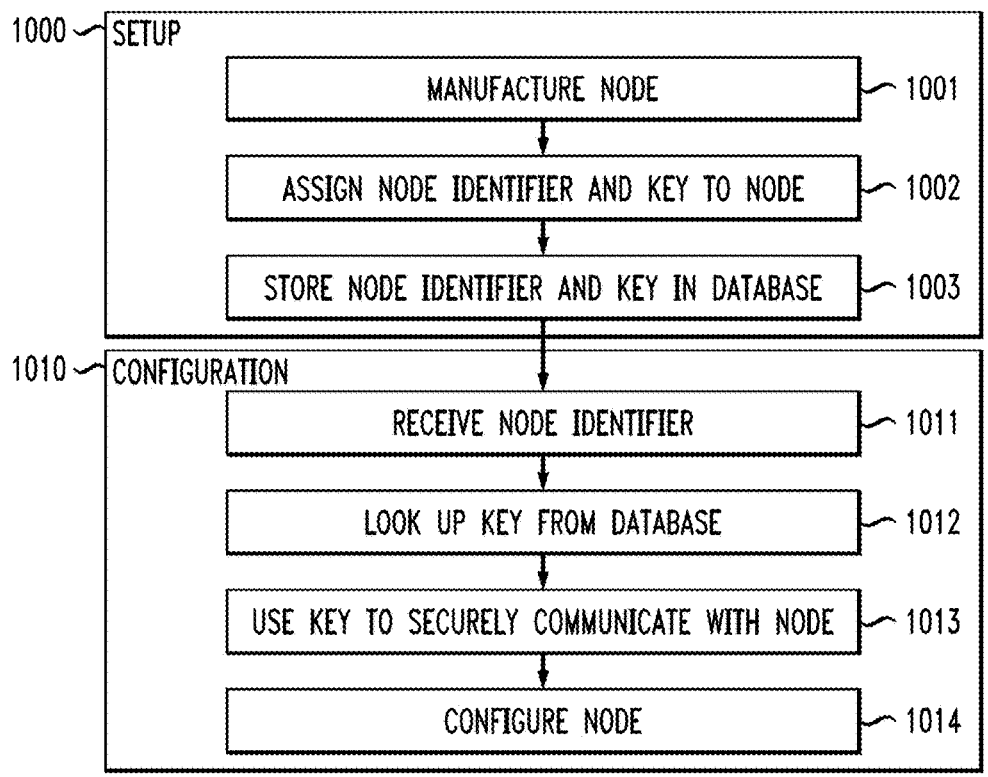

FIG. 10 illustrates the setup 1000 and configuration 1010 of a node. In step 1001, the node is manufactured, and in 1002, a node identifier and key are assigned to the node. The node identifier can be a serial number which may identify the product type or version, and the key may be a random or pseudorandom number, e.g., a 128 bit number that is preferably not predictable by a third party. The node identifier is associated with a node, e.g., by storing the value in memory associated with the node, such as flash or EEPROM, or by printing a representation of the value on a sticker attached to the node or its housing. The key is also associated with the node. In one embodiment, the key is stored in memory associated with the node, but in another it is also represented on a sticker later to be read by a mobile device and conveyed to the node, at which time it will be stored in memory associated with the node. The node identifier and the key are also stored in a database, e.g., associated with one of the mobile device used for installation, a server associated with a service provider, or a computer associated with the owner of the node.

In step 1011, a node identifier is received after having been read from the node, e.g., in one of the ways described elsewhere herein. The corresponding key is looked up from the database in step 1012, and the key is used to securely communicate with the node in step 1013. For example, data to be transmitted may be authenticated and/or encrypted using the key, or one or two portions of the key. In step 1014, using the secure communication channel, the node is configured.

Figure 11:
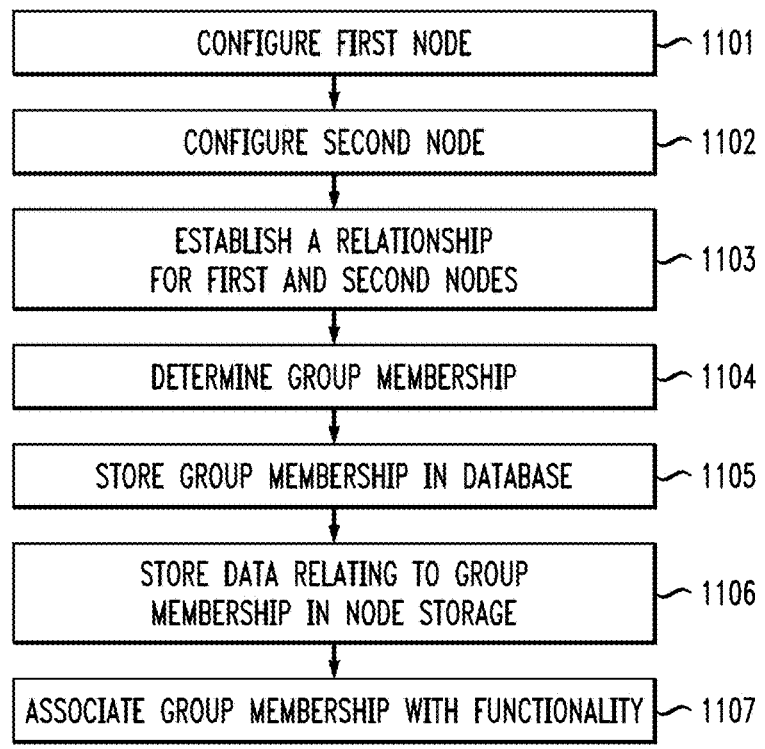

FIG. 11 illustrates the creation of groups. In steps 1101 and 1102, respectively, a first and a second node are configured. One example configuration step is to enable the nodes to connect to a WiFi network, e.g., by transmitting the SSID and the credential to the nodes from a mobile device or a backend, aspects of which were previously described in conjunction with FIGS. 9 and 10. In step 1103, a relationship is established for the first and second nodes. In step 1104, a group membership is automatically determined. In step 1105, the group membership is stored in a database. In step 1106, data relating to group membership is stored in node storage. The group membership is associated with at least one particular functionality in step 1107.

Examples of membership groups include all of the nodes associated with a particular account; all nodes within Bluetooth radio distance from each other; all nodes of the same type, e.g., switches; all nodes in one room, which can be determined by comparing the signals observed by the sensors of the different nodes and grouping nodes whose measured signals exceed a threshold value; or combinations or variations of these. A user such as an admin may then modify at least some of the groups, add additional group memberships, such as a group that corresponds to all outlets that should be automatically turned off in terms of providing electric current under some condition such as nobody being present. Such user input may be obtained using an interface and using the mobile device or another device associated with the account to which the nodes are assigned.

The nodes of a first group may be automatically controlled based on detecting a first situation; and the nodes of a second group may be possible to control by a user with a given access right level. The groups may overlap. Rights associated with nodes may be controlled based on the identity of the user attempting to control them, whether this is determined by determining a radio identifier indicative of a co-present user; a Hypertext Markup Language (HTML) cookie and/or a username and credential of a user accessing a portal; or by rights granted using, e.g., OAUTH, Security Assertion Markup Language (SAML) or other mechanisms for controlling access.

Figure 12:
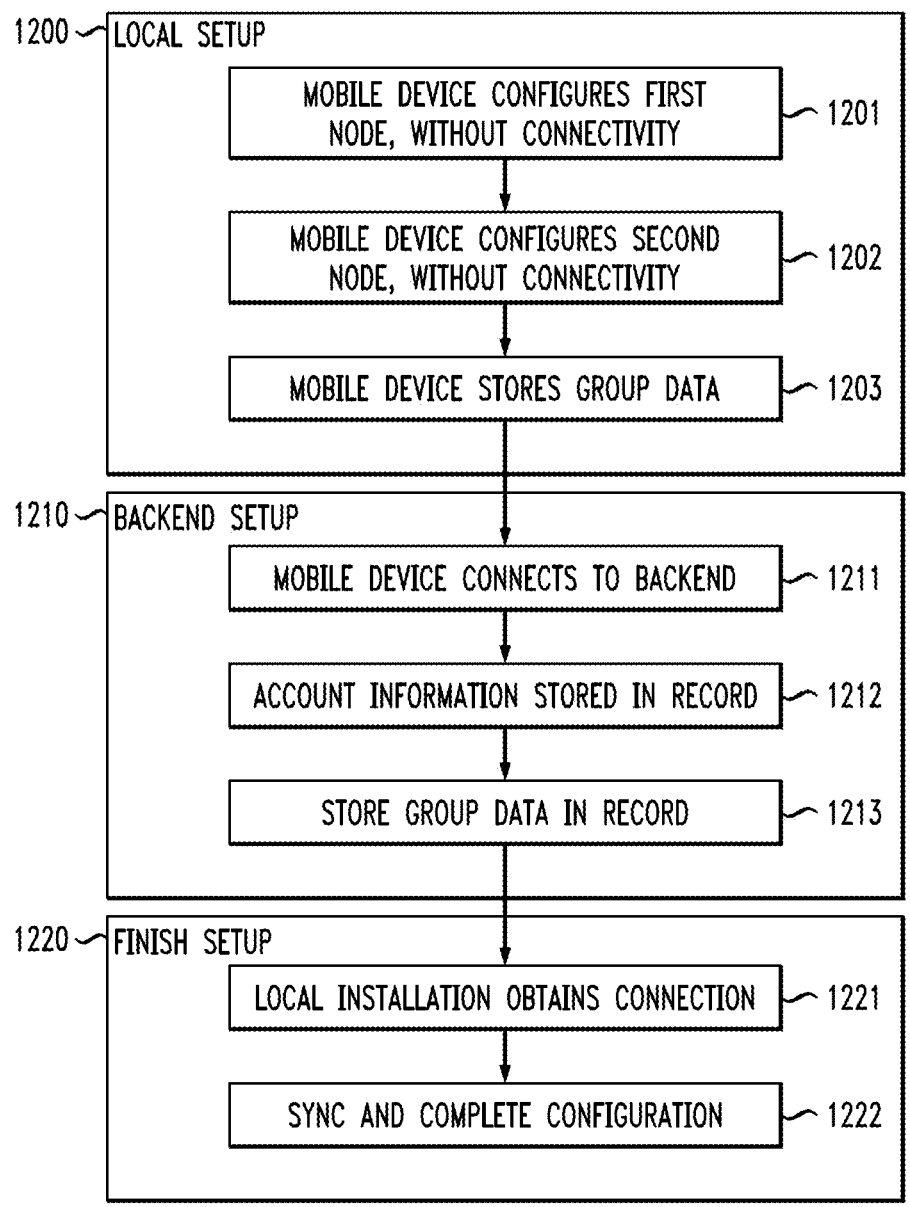

FIG. 12 illustrates the setup of two or more nodes that are not connected to the Internet, which is a common situation in a construction site. The setup in this embodiment includes three phases, denoted by respective reference numerals 1200, 1210 and 1220. Phase 1200 corresponds to a local setup of two or more nodes using a mobile device without connectivity. Phase 1210 corresponds to the creation of a record on a backend, corresponding to the local setup. Phase 1220 corresponds to a completion of the setup.

In step 1201, a first local node is configured using a mobile device as an interface, illustratively without the mobile device having Internet connectivity to a backend of the system, such as a backend server. The first local node may be configured by the mobile device operator, who may provide the node with a SSID that can later be used to connect to the Internet, and an optional password if access requires a password. Alternatively, the first node can be paired with the mobile device. A similar process is then performed for a second node in step 1202. The mobile device obtains or generates one or more group assignments of the first and second node. This is based on sensor output of the nodes, on admin input from the admin operating the mobile device, or a combination of these. In some situations, no group data is obtained at all, or all nodes are assigned to the same group. Data relating to the nodes and the group data is stored with the mobile device, as indicated in step 1203. In addition, the mobile device may store information provided by the admin, such as the address of the installation comprising the first and second node, a user name associated with the installation, and a password or other credential associated with the installation.

In step 1211, which may take place at a later time when the mobile device is connected to the Internet, the mobile device connects to the backend, preferably automatically. The mobile device transmits data related to the installation to the backend, which stores such data in step 1212 and step 1213. The data transmitted comprises data related to the account, such as user name and a credential, data related to the two or more nodes, such as type, partial configuration information, group data, and data related to the address of the installation.

In step 1221, at least one of the first node and the second node gains Internet connectivity, causing an automated connection to be made to the backend. The connection may be made using a router with the previously obtained SSID and password; a router without any password security but which at least the first or the second node was able to connect to, or a Bluetooth or other connection to the mobile device which has already been paired, at a time when the mobile device has an Internet connection. A person of skill in the art will recognize that these are just illustrative examples. In step 1222, the connecting node transmits potential additional information to the backend, and is associated with the correct record using one of an installation identifier, the username and potentially the credential, a key, or other data, as previously described. The connection may be a secure connection, e.g., an SSL connection. The backend transmits optional configuration information to the node. These and other synchronization operations are performed to complete the configuration.

The particular processing operations shown in the flow diagrams of FIGS. 1 and 9 through 12 are presented by way of example only, and should not be construed as limiting in any way. For example, the ordering of the steps can be varied, and additional or alternative steps can be used in place of the particular steps shown. It is also possible that certain steps can be performed at least in part concurrently with one another instead of in the particular order illustrated in the flow diagrams.

Figure 13:
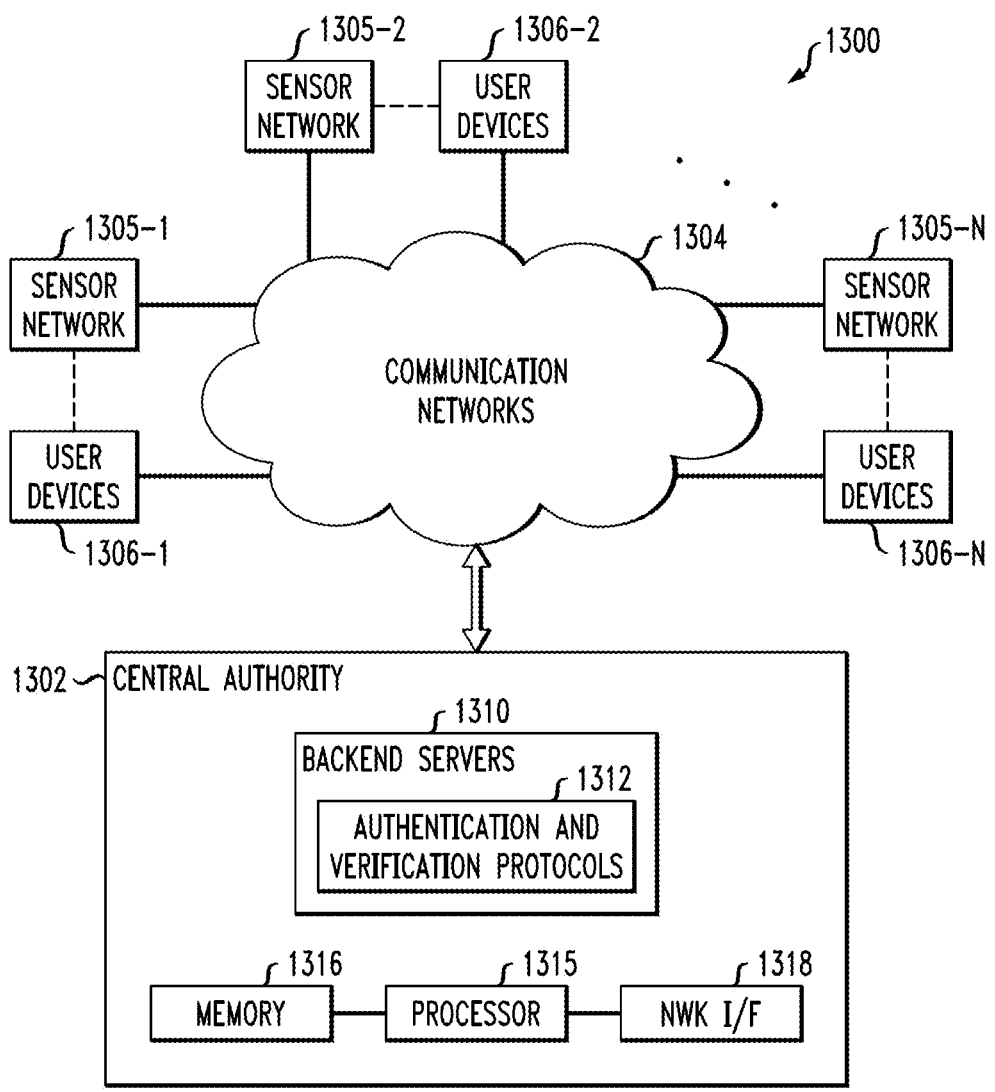
FIG. 13 is a block diagram of an information processing system that implements functionality for configuration and management of smart nodes with limited user interfaces in an illustrative embodiment.

Referring now to FIG. 13, an example information processing system 1300 of an illustrative embodiment is shown. The system 1300 in this embodiments is configured with functionality for configuration and management of smart nodes with limited user interfaces. For example, the system 1300 is illustratively configured to execute processes of the type previously described in conjunction with FIGS. 1 and 9 through 12. At least some of the smart nodes illustratively comprise respective sensor devices of one or more sensor networks, although additional or alternative types of smart nodes can be used in other embodiments. A given such smart node in some instances includes a limited user interface, but other types of smart nodes can include more complex user interfaces.

The system 1300 in the present embodiment more particularly comprises a central authority 1302 coupled via one or more communication networks 1304 to a plurality of distinct sensor networks 1305-1, 1305-2, . . . 1305-N. Each such sensor network is assumed to comprise a set of sensor devices of the type described elsewhere herein. A given set of sensor devices is also referred to herein as a "collection" of sensor devices. The sensor networks 1305-1, 1305-2, . . . 1305-N interact with respective sets of user devices 1306-1, 1306-2, . . . 1306-N. The sets of user devices 1306 are not necessarily disjoint, as some of the user devices can interact with multiple ones of the sensor networks 1305. The user devices 1306 can comprise, for example, desktop, laptop or tablet computers, mobile telephones, smart watches, gaming systems or other types of devices associated with one or more system users and capable of communicating with central authority 1302 over the communication networks 1304.

Some of the user devices 1306 comprise respective instances of what are generally referred to herein as "mobile devices" and those can include, for example, laptop or tablet computers, mobile telephones, smart watches, etc. Other types of mobile devices can be used in other embodiments, and the term "mobile device" as used herein is therefore intended to be broadly construed.

The dashed lines between the user devices 1306 and the sensor networks 1305 are intended to encompass a wide variety of different types of interaction that can be supported in a given implementation. Such interactions are not limited to machine-to-machine communications using wired or wireless communication protocols, but more generally encompass visual, aural, haptic and/or other types of interaction. For example, a sensor device can present an image to a user via a display, and/or play an audio file to a user via a speaker, in conjunction with the implementation of one or more processes for configuration and management of smart nodes with limited user interfaces as described elsewhere herein.

The central authority 1302 illustratively comprises a processing platform that includes one or more processing devices. For example, the central authority 1302 can be implemented as one or more computers, servers or other backend devices that are configured to interact with the sensor networks 1305 and the user devices 1306. In other embodiments, multiple separate central authorities can be provided, each having responsibility for configuration and management of a different subset of the sensor networks 1305. The central authority 1302 can include additional or alternative components, such as, for example, a database or other repository of the type referred to elsewhere herein. The term "central authority" as used herein is intended to be broadly construed, so as to encompass a computer, server or backend device coupled to a network, and should not be viewed as requiring any particular geographical relationship relative to the particular sensor networks 1305 for which it is responsible. It is illustratively referred to as "central" in this embodiment in that it provides a common control point for configuration and management of the sensor networks 1305.

Similarly, the term "backend server" as used herein is intended to be broadly construed, so as to encompass a server that is reachable over a network connection from a user device, and performs various backend-type functions relating configuration and management of nodes of one or more of the sensor networks 1305, such as performing authentication and verification protocols 1312 in conjunction with establishing associations between particular sensor devices or other types of nodes and a user account.

The "user" associated with a particular user account may be an individual human being, such as a homeowner, tenant or installer, but the term "user" should be understood to include other types of entities, including by way of example, hardware and/or software entities, such as robots and other automated entities configured with machine learning functionality or other forms of artificial intelligence. A given such user illustratively has at least one communication address (e.g., IP address, email address, mobile telephone number, etc.) or other contact information recorded with the central authority 1302 in association with the user account. Such a user may but need not have previously gone through a registration process with the central authority 1302. Instead, by way of example, contact information for that user may have been provided by another user that has gone through a registration process. Other techniques can be used to register users as that term is broadly used herein.

One or more of the sensor networks 1305 may each comprise a plurality of sensor devices deployed within an interior space and/or an exterior space of a residence or business. Such sensor devices are considered examples of what are more generally referred to herein as "nodes" of a set of nodes. The "nodes" as that term is broadly used herein can include smart nodes with limited user interfaces, smart nodes with more complex user interfaces, smart nodes with no user interfaces, and other types of nodes, as well as various combinations thereof. Numerous other arrangements are possible.

As indicated previously, illustrative embodiments advantageously provide enhanced security in these and other situations involving configuration and management of smart nodes with limited user interfaces. It is to be appreciated, however, that other types of sensor systems, and more generally other sets of nodes, can be utilized in other embodiments. Accordingly, embodiments disclosed herein should not be viewed as being limited in any way to use with particular types of sensor systems.

The central authority 1302 in the present embodiment comprises a plurality of backend servers 1310 that implement protocols 1312 for authentication, verification and other security-related functions within the system 1300. For example, the protocols 1312 include one or more authentication and/or verification protocols carried out in the manner disclosed herein in conjunction with configuration and management of smart nodes with limited user interfaces, as well as other types of nodes.

The backend servers 1310 and their associated protocols 1312 of the central authority 1302 are illustratively implemented at least in part in the form of software running on one or more processing devices, each of which includes a processor 1315 coupled to a memory 1316 and a network interface ("Nwk I/F") 1318. Example implementations of such components are described in more detail below.

In operation, a given one of the user devices 1306, such as a mobile telephone, tablet computer or other type of mobile device, is configured to obtain an identifier of a first node of a set of nodes deployed at a building or other structure, to associate the first node with a user account, to obtain an identifier of a second node of the set of nodes, and to associate the second node with the first node and the user account.

For example, the first and second nodes illustrative comprise respective sensor devices of a given one of the sensor networks 1305, which are illustratively deployed in at least one of an interior space and an exterior space of the building or other structure. It is also possible that the first and second nodes can be part of different ones of the sensor networks 1305.

Terms such as "associating" as used herein are intended to be broadly construed. For example, associating the second node with the first node and the user account can comprise associating the second node with the first node via the user account, and/or associating the second node with the user account via the first node. A wide variety of alternative associating arrangements are possible in illustrative embodiments.

In some embodiments, the first and second nodes at the time of their initial association are not yet part of any particular sensor network, but instead the creation of the association between these nodes and the user account serves to configure one of the sensor networks 1305 to include at least the first and second, and possibly one or more additional nodes.

For example, the user device can obtain identifiers of respective ones of a plurality of additional nodes of the set of nodes, and associate each of the additional nodes with the first node and the user account. A given such set of nodes includes the first node, the second node and one or more additional nodes, and the nodes when associated with one another collectively comprise one of the sensor networks 1305.

In some embodiments, associating the first node with the user account comprises establishing an association between the first node and the user account without the user device having access to a network connection. Additionally or alternatively, associating the first node with the user account comprises sending the identifier of the first node to one of the backend servers 1310 over a network connection. In such an arrangement, configuration information for the first node is illustratively is received from the backend server responsive to sending the identifier of the first node to the backend server.

Accordingly, some embodiments are configured to permit an association be established between the first node, the second node and the user account without the need for the user device to have any network connection.

By way of example, in some embodiments associations can be established between multiple nodes via one of the user devices 1306 without the user devices or the nodes having any network connection to one of the backend servers 1310 of the central authority 1302. As a more particular example, in an embodiment of this type, an electrician installs first and second nodes that include a wall switch and a light fixture controlled by that wall switch, where both are sensor devices that can be associated with one another in a sensor network. Using the techniques disclosed herein, the electrician can wirelessly assign a given lighting fixture to a given wall switch within a given user account without requiring any communication with one of the backend servers 1310.

Such arrangements are particularly beneficial in situations in which network access is spotty or not available at all. For example, a mobile device may be out of range of a cell tower with no available network connection to a backend server. Also, at certain construction sites or other installation sites a wireless network may not yet be installed. In these and numerous other situations, the mobile device can configure the nodes locally for association with one another and with a particular user account. Backend functions performed in conjunction with configuration and management of the nodes are performed only at such time a network connection becomes available.

It is therefore to be appreciated that the establishment of associations between nodes and a user account as disclosed herein does not require a network connection at the time of the association. For example, in some embodiments, the association between the first node and the user account is established using a "touch and pair" arrangement in which the first node is associated with the user account simply by activating an icon or other widget in a user interface of an application running on the mobile device and/or pressing a button on the first node. Similarly, associating the second node with the first node and the user account can occur automatically responsive to initiation of a designated association process at the processing device without requiring communication between the processing device and the backend server. Again, the designated association process can use a "touch and pair" arrangement.

In embodiments in which associating the first node with the user account comprises sending the identifier of the first node to one of the backend servers 1310 over a network connection, and receiving configuration information for the first node from the backend server responsive to sending the identifier of the first node to the backend server, at least a portion of the configuration information received from the backend server may be received by the user device and provided by the user device to the first node.

Additionally or alternatively, at least a portion of the configuration information received from the backend server may be received by the first node from the backend server without involvement of the user device. For example, such configuration information can be received directly by the first node from the backend server over a network connection between those two components.

At least a portion of the configuration information received from the backend server may be encrypted under a key of the first node that is not accessible to the user device. For example, the backend server and the first node can communicate securely using the node identifier and key referred to in the context of FIG. 10.

The configuration information can include, for example, credentials permitting the first node to access one or more local networks of the communication networks 1304 or one or more of the sensor networks 1305, information identifying the second node associated with the first node and the user account, and information identifying one or more additional nodes also associated with the first node and the user account. A wide variety of other types of configuration information can be used in other embodiments. As noted above, such configuration can be transmitted from the backend server to the first node via a particular one of the user devices 1306, or directly in a manner that bypasses the user device.

In some embodiments, one or more group memberships are determined by a particular one of the user devices 1306 for respective subsets of the first, second and additional nodes of the set of nodes, and information characterizing the one or more group memberships is sent by that user device to one or more of the backend servers 1310 for association with the user account. For example, a given one of the one or more group memberships may comprise one or more of all of the nodes associated with the user account, all nodes within a designated radio distance of one another, all nodes in communication with one another using a particular type of communication, all nodes of a particular type, and all nodes within a particular room or other designated portion of an area of the building or other structure.

Furthermore, different functionalities are illustratively associated with respective different ones of a plurality of the group memberships. A given one of the functionalities specifies at least one of one or more actions to be performed by the nodes of a corresponding group under designated conditions, and a particular access rights level required in order to allow a user to control one or more actions to be performed by the nodes of the corresponding group. For example, a particular subset of nodes of the first, second and additional nodes each having a given group membership are automatically configured in accordance with the associated functionality to perform the one or more actions responsive to detection of the designated conditions.

The particular features, advantages and other aspects described above are examples presented in the context of illustrative embodiments, and therefore such features, advantages and other aspects need not be present in other embodiments.

For example, references herein to "a system" or "the system" in conjunction with various distinct types of features or functionality should not be construed as a requirement that all such features or functionality be present within the same single system. Instead, different systems in different embodiments can include different combinations or other arrangements of the various disclosed features and functionality.

Also, references herein to particular features or other aspects as being "optional" refer to utilization in one or more particular embodiments, and should not be construed as an indication that any other features or aspects, such as features or aspects not explicitly referred to as optional, are required in any particular embodiments.

Illustrative embodiments include systems, methods, apparatus and computer program products comprising non-transitory storage media storing program code.

For example, an illustrative embodiment provides a method to associate a node with a network. The method in this embodiment comprises using a device to establish a connection to a server; receiving, at the device, an identifier associated with the node, using at least one of user-input of the identifier in an interface associated with the device, scanning a visual encoding of the identifier using a camera associated with the device, and receiving the identifier using a wireless communication channel between the node and the device; transmitting over a secure channel from the device to the server the identifier and an indicator associated with a profile; receiving, by the device from the server, over the secure channel at least one of a key associated with the node and an encrypted first network access credential; transmitting, by the device to the node, at least one of the encrypted first network access credential and an encrypted second access credential stored by the device wherein the encryption is performed using the key associated with the node; decrypting, by the node, the received encrypted first or second access credential; storing, by the node, the first or second access credential in non-volatile memory; and connecting, by the node, to the local network using the first or second access credential.

In another illustrative embodiment, a system comprises an interface, a repository, and at least one node, wherein the system receives, using the interface, a registration request comprising an identifier associated with the at least one node. The system verifies that the identifier is valid; the system initiates a verification of privileged access for the node; conditional on the outcome of the verification that the identifier is valid and the verification of privileged access for the node, the system stores the identifier associated with the at least one node in the repository; and the system further receives data transmitted by the node, applies a computation to the received data, and stores in the repository the results of the computation, associated with a record associated with the identifier of the node; and wherein the stored result of the computation is used to select an action initiated by the system.

In some embodiments, the identifier associated with the at least one node is associated with a first account. The system receives a request associated with the first account to associate the identifier associated with the at least one node with a second account.

Additionally or alternatively, the first account and the at least one node are associated with at least one access right descriptor.

Some embodiments implement a process that includes creating an account; using a mobile device to obtain a first identifier associated with a first node; associating the first identifier with the account by providing configuration data to the first node; using a mobile device to obtain a second identifier associated with a second node; associating the second identifier with the account by providing configuration data to the second node; and obtaining sensor data from the first and the second node. The mobile device can obtain the identifier by, for example, receiving a radio signal, by performing a scan using a camera, or by receiving input from an operator.

In illustrative embodiments of this type, each node, as it is "obtained" by a user for association with one or more other nodes and a user account, comes with a unique identifier and a key, where the key is not predictable and is not obtained by the mobile device. As the node is associated with the user account, data being sent between the node and a central authority is protected using the key. Here, the mobile device is communicatively coupled with the central authority.

Illustrative embodiments are configured to assign nodes associated with an account to two or more groups based on at least one of determining proximity between nodes and obtaining a selection from the mobile device at the time the node is associated with the account. Here, the group illustratively corresponds to a functional selection of nodes that can be controlled collectively, and/or to which access can be granted collectively by a user with a particular identity or role.

The system in some embodiments provides an interface that enables different users, based on role and/or identity, to access or configure nodes, where access can be limited to certain types of access (e.g., read-only, write-only, only some times of the day, only some types of data, etc.) based on the role and/or identity of the user.

As a more particular example of item 1 above, consider a home with a large number of new nodes (e.g., 150 new nodes). A given embodiment can be configured to allow a user to attach the first new node to an account, whether it be an installer's account, an owner's account or another type of user account, and to allow the user to easily add all the other nodes to the system, possibly through use of a press of a button on a node device within a set time window and "RF distance" or acoustic or optical communication between nodes and devices. The registration of each new node illustratively adopts the local wireless network configuration via the mobile device or the previous node.

Additionally or alternatively, an installer can bind all the devices together without the presence of a public network or a backend for registration and possibly without a mobile device at all. Such an arrangement would be beneficial, for example, in remote locations that may have no connectivity for several weeks or months. The devices could still communicate through a local Bluetooth mesh and coordinate node actions, such as a switch wirelessly controlling a nearby outlet. Once the connectivity becomes available in such an arrangement, so does the backend and an "owner" assignment.

These particular features of illustrative embodiments are presented by way of example only, and should not be viewed as limiting in any way. A wide variety of alternative embodiments are possible, as will be readily appreciated by those skilled in the art.

The above-described system and other processing entities described herein may be part of an information processing system. A given such entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, a microcontroller, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

Each processing device of the processing platform comprises a processor coupled to a memory. As indicated above, the processor may comprise a microprocessor, a microcontroller, an ASIC, an FPGA, a CPU, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM, flash memory or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system level virtualization infrastructure comprising Docker containers or other types of containers implemented using respective Linux kernel control groups. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative configuration and/or management related processing contexts. Also, the particular types and configurations of system entities, processing devices and process operations can be varied in other embodiments. In addition, the particular assumptions made herein in the context of describing aspects of certain illustrative embodiments need not apply in other embodiments. These and numerous other alternative embodiments will be readily apparent to those skilled in the art.

What is claimed is:

1. An apparatus comprising:
   at least one processing device comprising a processor coupled to a memory;
   said at least one processing device being configured:
      to obtain an identifier of a first node of a set of nodes deployed at a building or other structure;
      to associate the first node with a user account, wherein associating the first node with the user account comprises sending the identifier of the first node to a backend server over a network connection, wherein configuration information for the first node is received from the backend server responsive to sending the identifier of the first node to the backend server;
      to obtain an identifier of a second node of the set of nodes; and
      to associate the second node with the first node and the user account, wherein associating the second node with the first node and the user account occurs automatically responsive to initiation of a designated association process at the processing device without requiring communication between the processing device and the backend server;
   wherein the designated association process comprises obtaining configuration information for the second node from (i) the first node or (ii) at least one other node of the set of nodes;
   wherein at least a portion of the configuration information for the first node, received from the backend server, is encrypted under a key of the first node that is not accessible to the processing device; and
   wherein the key of the first node comprises a symmetric key generated by the first node utilizing a function that takes as input sensor data associated with the first node, wherein the symmetric key generated by the first node is encrypted utilizing a public key of the backend server, and wherein the encrypted symmetric key is sent to the backend server over the network connection as part of associating the first node with the user account.

2. The apparatus of claim 1 wherein said at least one processing device comprises at least one of a mobile telephone and a computer.

3. The apparatus of claim 1 wherein at least one of the first and second nodes each comprises a sensor device of a sensor network deployed in at least one of an interior space and an exterior space of the building or other structure.

4. The apparatus of claim 1 wherein said at least one processing device is further configured to obtain identifiers of respective ones of a plurality of additional nodes of the set of nodes, and to associate each of the additional nodes with the first node and the user account.

5. The apparatus of claim 1 wherein associating the first node with the user account comprises establishing an association between the first node and the user account without the processing device having access to a network connection.

6. The apparatus of claim 1 wherein at least a portion of the configuration information received from the backend server is received by the processing device and provided by the processing device to the first node.

7. The apparatus of claim 1 wherein at least a portion of the configuration information received from the backend server is received by the first node from the backend server without involvement of the processing device.

8. The apparatus of claim 1 wherein at least a portion of the configuration information received from the backend server comprises at least one of:
credentials permitting the first node to access one or more local networks;
information identifying the second node associated with the first node and the user account; and
information identifying one or more additional nodes also associated with the first node and the user account.

9. The apparatus of claim 4 wherein said at least one processing device is further configured:
to determine one or more group memberships for respective subsets of the first, second and additional nodes of the set of nodes; and
to send information characterizing the one or more group memberships to a backend server for association with the user account.

10. The apparatus of claim 9 wherein a given one of the one or more group memberships comprises at least one of:
all of the nodes associated with the user account;
all nodes within a designated radio distance of one another;
all nodes in communication with one another using a particular type of communication;
all nodes of a particular type; and
all nodes within a particular room or other designated portion of an area of the building or other structure.

11. The apparatus of claim 9 wherein different functionalities are associated with respective different ones of a plurality of the group memberships, with a given one of the functionalities specifying at least one of:
one or more actions to be performed by the nodes of a corresponding group under designated conditions; and
a particular access rights level required in order to allow a user to control one or more actions to be performed by the nodes of the corresponding group.

12. The apparatus of claim 11 wherein a particular subset of nodes of the first, second and additional nodes each having a given group membership are automatically configured in accordance with the associated functionality to perform the one or more actions responsive to detection of the designated conditions.

13. A method comprising:
obtaining an identifier of a first node of a set of nodes deployed at a building or other structure;
associating the first node with a user account, wherein associating the first node with the user account comprises sending the identifier of the first node to a backend server over a network connection, wherein configuration information for the first node is received from the backend server responsive to sending the identifier of the first node to the backend server;
obtaining an identifier of a second node of the set of nodes; and
associating the second node with the first node and the user account, wherein associating the second node with the first node and the user account occurs automatically responsive to initiation of a designated association process at a processing device without requiring communication between the processing device and the backend server;
wherein the designated association process comprises obtaining configuration information for the second node from (i) the first node or (ii) at least one other node of the set of nodes;
wherein at least a portion of the configuration information for the first node, received from the backend server, is encrypted under a key of the first node that is not accessible to the processing device;
wherein the key of the first node comprises a symmetric key generated by the first node utilizing a function that takes as input sensor data associated with the first node, wherein the symmetric key generated by the first node is encrypted utilizing a public key of the backend server, and wherein the encrypted symmetric key is sent to the backend server over the network connection as part of associating the first node with the user account; and
wherein the method is performed by at least one processing device comprising a processor coupled to a memory.

14. The method of claim 13 wherein associating the first node with the user account comprises establishing an association between the first node and the user account without the processing device having access to a network connection.

15. A computer program product comprising a non-transitory processor-readable storage medium having stored therein program code of one or more software programs, wherein the program code when executed by at least one processing device causes said at least one processing device:
to obtain an identifier of a first node of a set of nodes deployed at a building or other structure;
to associate the first node with a user account, wherein associating the first node with the user account comprises sending the identifier of the first node to a backend server over a network connection, wherein configuration information for the first node is received from the backend server responsive to sending the identifier of the first node to the backend server;
to obtain an identifier of a second node of the set of nodes; and
to associate the second node with the first node and the user account, wherein associating the second node with the first node and the user account occurs automatically responsive to initiation of a designated association process at the processing device without requiring communication between the processing device and the backend server;
wherein the designated association process comprises obtaining configuration information for the second node from (i) the first node or (ii) at least one other node of the set of nodes;
wherein at least a portion of the configuration information for the first node, received from the backend server, is encrypted under a key of the first node that is not accessible to the processing device; and
wherein the key of the first node comprises a symmetric key generated by the first node utilizing a function that takes as input sensor data associated with the first node, wherein the symmetric key generated by the first node is encrypted utilizing a public key of the backend server, and wherein the encrypted symmetric key is sent to the backend server over the network connection as part of associating the first node with the user account.

16. The computer program product of claim 15 wherein associating the first node with the user account comprises establishing an association between the first node and the user account without the processing device having access to a network connection.

17. The apparatus of claim 1 wherein the designated association process comprises determining a location of the second node relative to the first node and the at least one other node of the set of nodes.

18. An apparatus comprising:
at least one processing device comprising a processor coupled to a memory;
said at least one processing device being configured:
to obtain an identifier of a first node of a set of nodes deployed at a building or other structure;
to associate the first node with a user account, wherein associating the first node with the user account comprises sending the identifier of the first node to a backend server over a network connection, wherein configuration information for the first node is received from the backend server responsive to sending the identifier of the first node to the backend server;
to obtain an identifier of a second node of the set of nodes; and
to associate the second node with the first node and the user account, wherein associating the second node with the first node and the user account occurs automatically responsive to initiation of a designated association process at the processing device without requiring communication between the processing device and the backend server;
wherein the designated association process comprises obtaining configuration information for the second node from (i) the first node or (ii) at least one other node of the set of nodes;
wherein the designated association process comprises determining a location of the second node relative to the first node and the at least one other node of the set of nodes; and
wherein determining the location of the second node relative to the first node and the at least one other node of the set of nodes comprises:
causing the second node to play an audio or ultrasonic ping; and
obtaining reports of a strength of the audio or ultrasonic ping from the first node and the at least one other node of the set of nodes.

19. The apparatus of claim 17 wherein determining the location of the second node relative to the first node and the at least one other node comprises determining similarities between background sensor readings of the second node, the first node and the at least one other node of the set of nodes.

20. The computer program product of claim 15 wherein the designated association process comprises determining a location of the second node relative to the first node and the at least one other node of the set of nodes.

* * * * *